United States Patent [19]

Kadono et al.

[11] Patent Number: 5,343,501
[45] Date of Patent: Aug. 30, 1994

[54] ORTHOGONAL TRANSFORM APPARATUS FOR VIDEO SIGNAL PROCESSING

[75] Inventors: Shinya Kadono; Masakazu Nishino; Tatsuro Juri; Hiroshi Horikane; Iwao Hidaka, all of Osaka, Japan

[73] Assignee: Matsushita Electric Industrial Co., Ltd., Osaka, Japan

[21] Appl. No.: 836,660

[22] Filed: Feb. 18, 1992

[30] Foreign Application Priority Data

Feb. 19, 1991 [JP] Japan .................... 3-24421

[51] Int. Cl.$^5$ ................... H04L 27/06; G06F 7/38
[52] U.S. Cl. .................... 375/94; 364/425; 364/426; 348/384
[58] Field of Search .............. 364/725, 726; 358/133; 375/94; 370/19, 21, 23

[56] References Cited

U.S. PATENT DOCUMENTS

| | | | |
|---|---|---|---|
| 4,385,363 | 5/1983 | Widergren et al. | 364/725 |
| 4,679,163 | 7/1987 | Arnould et al. | 364/725 |
| 4,754,491 | 6/1988 | Mischler et al. | 364/725 |
| 4,760,543 | 7/1988 | Ligtenberg et al. | 364/725 |
| 4,841,464 | 6/1989 | Guichard et al. | 364/725 |
| 4,849,922 | 7/1989 | Riolfo | 364/725 |
| 4,873,658 | 10/1989 | Cambonie | 364/725 |
| 4,912,668 | 3/1990 | Aubie et al. | 364/725 |
| 5,029,122 | 7/1991 | Uetani | 364/725 |
| 5,053,985 | 10/1991 | Friedlander et al. | 364/725 |
| 5,117,381 | 5/1992 | Juri et al. | 364/725 |
| 5,163,103 | 11/1992 | Uetano | 364/725 |
| 5,196,930 | 3/1993 | Kadono et al. | 358/133 |
| 5,249,146 | 9/1993 | Uramoto et al. | 364/725 |

FOREIGN PATENT DOCUMENTS 0248729 12/1987 European Pat. Off. .
0467718 1/1992 European Pat. Off. .
2581463 11/1986 France .

Primary Examiner—Stephen Chin
Assistant Examiner—T. Ghebretinsae
Attorney, Agent, or Firm—Lowe, Price, LeBlanc & Becker

[57] ABSTRACT

In an apparatus for executing an algorithm for realizing an orthogonal transform operation such as the 8 points fast cosine transform, by operating on successive sets of data values of a digital signal such as a digital video signal in such applications as high efficiency coding of a digital video signal, a plurality of multiplication operations that are executed during processing of each set of data values are executed sequentially by time division multiplex operation of a single multiplier (32) which is capable of executing a multiplication operation within one sample period of the digital signal, with input and output data values being transferred by selector units (11, 33, 41) between the multiplier and other sections of the apparatus at appropriate times during processing of each set of the input digital signal values. The scale of hardware required for the apparatus is thereby reduced by comparison with an apparatus which employs a plurality of separate multipliers.

11 Claims, 15 Drawing Sheets

ORTHOGONAL TRANSFORM APPARATUS FOR VIDEO SIGNAL PROCESSING

BACKGROUND OF THE INVENTION

1. Field of the Invention

The present invention relates to an orthogonal transform apparatus for executing a fast cosine transform or fast inverse cosine transform, for use in preprocessing or postprocessing of a video signal in applications such as high efficiency coding of a video signal.

2. Description of the Related Art

In the prior art, fast algorithms have been used in various types of orthogonal transform apparatus, in order to reduce the scale of hardware of the apparatus. There is a conspicuous trend towards the use of such a fast algorithm in the case of a cosine transform or an inverse cosine transform in which large numbers of multiplication operations are necessary.

FIG. 7 is a signal flow chart to illustrate the 8 points cosine transform, which is one type of orthogonal transform. In FIG. 7, $\{y_0, y_1, y_2, y_3, y_4, y_5, y_6, y_7\}$ denote a set of 8 input signals, and $\{z_0, z_1, z_2, z_3, z_4, z_5, z_6, z_7\}$ denote a set of 8 output signals. In a practical apparatus for executing such a transform, the 8 input signals actually consist of a set of 8 data values (i.e. digital sample values) from a digital signal such as a digital video signal, with the time axis sequence of the input signal values having been changed by the operation of a reordering unit 1 as described hereinafter, from the original time axis sequence of $\{y_0, y_1, \ldots y_7\}$. That is to say, successive sets of 8 sequential data values of the input digital signal are respectively processed in accordance with the algorithm of FIG. 7, with a corresponding set of orthogonally processed output data values being produced in correspondence with each of these sets of data values of the input digital signal.

FIG. 8 is a block diagram showing the basic components of a prior art orthogonal transform apparatus for executing the orthogonal transform of FIG. 7, and FIG. 15 is a timing diagram corresponding to the signal flow chart of FIG. 7, showing the time relationships between various stages of the processing that is executed in the apparatus of FIG. 8.

The relationship between the input and output signal values of the signal flow chart of FIG. 7 is expressed as follows:

$$z_i' = \sum_{j=0}^{7} \delta_i \cdot \cos(i \cdot (j + 0.5) \cdot \pi/8) \cdot y_i$$

$$z_i = w_i \cdot z_i'$$

| i | $w_i$ |
|---|---|
| 0 | $1/\cos(\pi/4)$ |
| 1 | $\cos(\pi/4) \cdot \cos(3\pi/8)/\cos(7\pi/16)$ |
| 2 | $0.5/\cos(3\pi/8)$ |
| 3 | $\cos(\pi/4)/\cos(5\pi/16)$ |
| 4 | $0.875/\cos(\pi/4)$ |
| 5 | $1/\cos(3\pi/16)$ |
| 6 | $1/\cos(\pi/8)$ |
| 7 | $1/\cos(\pi/16)$ |

In the above, $\delta_i$ is a function which takes the value 1 if i is positive, and takes the value $\cos \pi/4$ if i is zero. In FIG. 7, each of the arrows denotes an addition or subtraction operation, with the full lines denoting addition and the dotted lines denoting subtractions. The circle and square outlines each denote a multiplication operation in which an input signal is multiplied by a fixed coefficient, with the contents of each outline (i.e. $2C_4$, $\frac{7}{8}$, etc.) indicating the respective coefficients. The square outline denotes a multiplication which can be executed by a binary shift operation, while each circular outline denotes a multiplication which cannot be executed by such a binary shift operation alone. To distinguish between these two types of operation, the latter type of multiplication operation will be referred to in the following as an "actual multiplication".

FIG. 8 is a block diagram of an orthogonal transform apparatus for executing the orthogonal transform algorithm that is shown in the signal flow chart of FIG. 7. In FIG. 8, numeral 1 denotes a reordering unit which receives successive data values (i.e. digital sample values) of an input digital signal in successive sample periods, and functions to reorder these data values of that digital signal. Specifically, the reordering unit 1 rearranges the sequence of values within each of successive sets of 8 sequential data values, and the reordered set of 8 values are then operated on by a pipeline processing flow, described in detail hereinafter. Numeral 2 denotes a butterfly unit for executing a form of computation referred to as a butterfly operation (as described hereinafter) on the output values produced from the first reordering unit, 3 denotes a reordering unit for reordering the outputs produced from the butterfly unit 2, 4 denotes a multiplier for multiplication of predetermined ones of the outputs from the reordering unit 3 by a a fixed coefficient ($2C_4$), and 5 denotes an adder for addition of outputs produced from the reordering unit 3. 6 denotes a selector unit which functions, in each sample period of the input digital signal, to select one out of three outputs, specifically an output from the reordering unit 3, an output from the multiplier 4 or an output from the adder 5. 7 denotes a butterfly unit, for executing a butterfly operation on outputs produced from the selector unit 6, 8 denotes a reordering unit for reordering the outputs produced from the butterfly unit 7, 9 denotes a multiplier for multiplying specific ones of the outputs produced from the reordering unit 8 by respective predetermined coefficients (i.e. the coefficients $C_4$, $2C_2$, $2C_6$ shown in FIG. 7), and 10 denotes an adder for addition of outputs produced from the reordering unit 8. 11 denotes a selector unit for selecting one out of three outputs during each sample period of the input digital signal, specifically, respective outputs from the multiplier 9, from the adder 10 and from the reordering unit 8. 12 denotes a butterfly unit for executing butterfly operation on outputs produced from the selector unit 11. 13 denotes a multiplier, for multiplication of outputs produced from the butterfly unit 12 by predetermined coefficients (i.e. by $\frac{7}{8}$, $C_4$, and $C_4C_6$ shown in FIG. 7), and 14 denotes a reordering unit for reordering the outputs produced from the multiplier 13, to obtain orthogonally transformed signals. In FIG. 7 the reference numerals indicate the respective operations that are executed by units in FIG. 8.

With an orthogonal transform apparatus having the configuration of FIG. 8, the operation is as follows. A set of 8 successive input signal digital signal values $\{y_0, \ldots, y_7\}$ are reordered by the reordering unit 1 to have the sequence $\{y_0, \ldots, y_3, y_7, \ldots, y_4\}$ as shown in FIG. 7. The successive outputs produced from the reordering unit 1 are subjected to butterfly operation by the butterfly unit 2. Here, the term "butterfly operation" signifies an operation of computing respective sums and differences between successive pairs of data values as illustrated in FIG. 7, with each sum or difference being derived within one sample period of the input digital signal. The butterfly unit 2 executes such calculation processing on data that are separated along the time axis by 4 sample periods. Part of the output values produced from the butterfly unit 2 are multiplied by $2C_4$ times in the multiplier 4, and another part of the outputs from the butterfly unit 2 are added together in the adder 5. In the multiplication coefficients, the designation $C_i$ signifies $\cos(i \cdot /16)$, where i takes the values 2, 4 and 6 as shown in FIG. 7. The reordering unit 3 executes reordering of data that are to be added together, data that are to be multiplied by the coefficient $2C_4$, and data that are to be transferred directly, to be operated on in the next butterfly operation. The selector unit 6 selects an output from the reordering unit 3, the multiplier 4 or the adder 5 to be inputted to the butterfly unit 7, in accordance with the time at which the selection operation is being executed. The butterfly unit 7 executes butterfly operation on data that are separated by two sample periods, and the outputs produced from the butterfly unit 7 are supplied to the reordering unit 8, to be reordered along the time axis as required for the succeeding processing. Part of the outputs from the reordering unit 8 are multiplied by $C_4$ times, by $2C_2$ times, or by $2C_6$ times in the multiplier 9, and part of the outputs from the reordering unit 8 are added together in the adder 10. The selector unit 11 selects outputs from the reordering unit 8, from the multiplier 9, or from the adder 10, in accordance with the time at which selection is executed, and inputs the selected outputs to the butterfly unit 12. The butterfly unit 12 executes butterfly operation on data that are separated by one sample period, and the results are multiplied by 1, by $\frac{1}{8}$ times, by 2 times, by $C_4 \cdot C_6$ times, or by $C_4$ times, in the multiplier 13. The results of the above processing are generated in the sequence $\{z_0, z_4, z_2, z_6, z_1, z_7, z_3, z_5\}$ as shown in FIG. 7, so that the reordering unit 14 rearranges the sequence to become $\{z_0, z_l, z_2, z_3, z_4, z_5, z_6, z_7\}$, as a set of 8 orthogonally transformed output data values.

The operation of the orthogonal transform apparatus of FIG. 8 can be clearly understood from the timing diagram of FIG. 15, which shows an example of actual time relationships between the various operations executed by the apparatus. Pipeline processing is utilized, and successive sample periods of the input digital signal are designated along the vertical direction as t0, t1, t2, . . . respectively, with each processing operation being executed within an integral number of sample periods. As indicated, the reordering unit 1 applies respective different amounts of delay to the 8 successive input data values $\{y_0, \ldots, y_7\}$ so that, for example, the signal value $x_0$ is delayed from the sample period $t_0$ to the sample period $t_7$, in which it is added to the value $x_7$ by the butterfly unit 2. It can further be understood that in 8 successive sample periods extending from t7, the butterfly unit 2 executes four successive addition operations followed by four successive subtraction operations. It can further be seen that the multiplier 4 executes two successive actual multiplications by the coefficient $2C_4$, on respective ones of two subtraction results produced from the butterfly unit 2, and thereafter the adder 5 executes two addition operations on two successive pairs of subtraction results produced from the butterfly unit 2. Similarly, the adder 10 executes three successive addition operations on sequentially produced pairs of outputs from the butterfly unit 7, and the multiplier 9 executes three successive actual multiplications on outputs produced from butterfly unit 7.

It can be understood from FIG. 15 that various amounts of delay are applied to signals that are produced within the apparatus of FIG. 8, by delay means which are omitted from FIG. 8 for simplicity of description, i.e. delays which are necessary for implementing the pipeline processing flow.

In the timing chart of FIG. 15, the outputs produced from the butterfly unit 12 are shown as being alternately supplied to the reordering unit 14 directly and after being multiplied by a coefficient. Where the output from the butterfly unit 12 is shown as being transferred directly to the reordering unit 14, that output from the butterfly unit is actually multiplied in the multiplier 13 by a coefficient having the value 1.

FIG. 9 is a signal flow chart of an algorithm for an orthogonal transform which is the inverse transform to that of of FIG. 7, i.e. which is an 8 points fast inverse cosine transform. FIG. 10 is a block diagram of an orthogonal transform apparatus corresponding to the signal flow chart of FIG. 9. In these Figs., blocks having an identical operation to blocks in FIG. 8 are indicated by corresponding designation numerals. With this apparatus as shown in FIG. 10, it is necessary to use three multipliers 21, 4 and 9, and two subtractors 22, 23, in addition to three butterfly units 2, 7 and 12. The operation of the apparatus of FIG. 10 is based on a pipeline processing flow, basically of the form described hereinabove referring to FIG. 15, for the apparatus of FIG. 8, so that detailed description of the operation of the apparatus of FIG. 10 will be omitted.

FIG. 11 shows a signal flow chart for a 2-dimensional cosine transform which consists of a 2 points cosine transform and a 4 points cosine transform. FIG. 13 shows a signal flow chart for a 2-dimensional inverse cosine transform which consists of a 2 points inverse cosine transform and a 4 points inverse cosine transform. FIG. 12 is a block diagram of an orthogonal transform apparatus for realizing the orthogonal transform of the signal flow chart of FIG. 11, and FIG. 13 shows an apparatus for realizing the transform of FIG. 12.

In FIG. 11, designating the input signals as $\{y_0, \ldots y_7\}$ and the output signals as $\{u_{0,0}, \ldots, u_{3,0}, u_{0,1}, \ldots u_{3,1}\}$, these output signals are expressed as follows:

$$u_{i,0}' = \sum_{j=0}^{3} \delta_i \cdot \cos(i \cdot (j + 0.5) \cdot \pi/4) \cdot (y_j + y_{j+4})$$

$$U_{i,0} = w_{2i} \cdot u_{i,0}'$$

$$u_{i,1}' = \sum_{j=0}^{3} \delta_i \cdot \cos(i \cdot (j + 0.5) \cdot \pi/4) \cdot (y_j - y_{j+4})$$

$$U_{i,1} = w_{2i} \cdot u_{i,1}'$$

In FIGS. 12 and 14, blocks having identical operation to blocks in FIGS. 8 and 10 are indicated by corresponding numerals. In the orthogonal transform apparatus of FIG. 12, two multipliers 9 and 13, one adder 10, and three butterfly units 2, 7 and 12 are utilized. In the orthogonal transform apparatus of FIG. 14, two multipliers 21 and 4, one subtractor 22, and three butterfly units 2, 7 and 12 are utilized. As the respective operations of FIGS. 12 and 14 can be understood from the signal flow charts of FIGS. 11 and 12 and the description given hereinabove of the orthogonal transform apparatus of FIG. 8, detailed description will be omitted.

With each of the above types of prior art orthogonal transform apparatus, it is necessary to use a plurality of multipliers, so that the scale of the necessary hardware is large. Furthermore it is necessary to use dedicated hardware to execute each of the four different types of orthogonal transforms described above, since it will be clear from the above description that, for example, the numbers of multipliers and numbers of adders required will vary in accordance with the particular type of orthogonal transform. Thus if it is required to provide an orthogonal transform apparatus which can be easily adapted to implementing a number of different types of orthogonal transform, then the scale of the necessary hardware would be further increased.

SUMMARY OF THE INVENTION

It is a first objective of the present invention to provide an orthogonal transform apparatus for executing an orthogonal transform operation on each of successive sets of data values of an input digital signal, whereby the number of multipliers that are required within the apparatus is reduced by comparison with the prior art, so that the hardware that is necessary for realizing an orthogonal transform can be reduced in scale.

It is a second objective of the invention to provide an orthogonal transform apparatus which can be easily reconfigured to execute respective ones of a plurality of different types of orthogonal transform, for example which can become reconfigured in response to a changeover control signal, and whereby the scale of hardware that is necessary to realize such an apparatus is not substantially greater than that of an orthogonal transform apparatus which is dedicated to one specific type of orthogonal transform.

The present invention basically achieves the above objective by time division multiplex operation of a single multiplier and a single adder, or of a single multiplier and a single subtractor, or of a single multiplier and a single adder/subtractor. That is made possible by ensuring that the multiplier can execute a multiplication operation within one sample period of the input digital signal, and that the adder or subtractor (or adder/subtractor) can execute an addition or subtraction operation within one sample period, and by providing selector means for appropriately supplying input signals to the multiplier and the adder or subtractor, and selector means for supplying output signals from the multiplier and adder or subtractor to respective units of the apparatus, in accordance with time-axis positions along the processing flow.

More specifically, according to a first aspect the present invention provides an orthogonal transform apparatus coupled to receive successive data values of an input digital signal, said data values occurring with a fixed sample period, the apparatus comprising:

first reordering means for reordering a sequence of data values within each of successive sets of eight of said data values;

first butterfly operational means for executing a butterfly operation consisting of addition and subtraction of output data values produced from said first reordering means;

second reordering means for reordering a sequence of output data values produced from said first butterfly operational means;

first delay means for delaying each output data value produced from said second reordering means by a fixed time delay;

first selector means for selecting one out of three output data values consisting of an output data value of said first delay means, an output data value of a multiplier means and an output data value of an adder means;

second butterfly operational means for executing a butterfly operation on output data values produced from said first selector means;

third reordering means for reordering a sequence of output data values produced from said second butterfly operational means;

second delay means for delaying each output data value produced from said third reordering means by a fixed time delay;

second selector means for selecting one out of three output data values consisting of an output from said second delay means, an output from said multiplier means, and an output of said adder means;

third butterfly operational means for executing a butterfly operation on output data values from said second selector means;

third delay means for delaying each output data value produced from said third butterfly operational means by a fixed time delay;

third selector means for selecting one out of two output data values consisting of an output from said third delay means and an output from said multiplier means;

fourth reordering means for reordering a sequence of output data values produced from said third selector means to obtain orthogonally transformed data values;

fourth selector means for selecting one out of three output data values consisting of an output data value from said second reordering means, an output data value from said third reordering means, and an output data value of said third butterfly operational means;

said multiplier means, for multiplying output data values from said fourth selector means by respective ones of a plurality of predetermined coefficients;

fifth selector means for selecting one of two output data values consisting of an output data value from said second reordering means and an output data value from said third reordering means; and said adder means, for executing addition of output data values produced from said fifth selector means;

wherein said apparatus executes a specific orthogonal transform computation on each of said sets of 8 successive data values of said input digital signal, by time division multiplex operation of said multiplier means and said adder means.

Such an apparatus according can be operated to execute both a 1-dimensional 8 points cosine transform and a 2-dimensional cosine transform consisting of a 2 points cosine transform and a 4 points cosine transform.

According to a second aspect, the invention provides an orthogonal transform apparatus coupled to receive successive data values of an input digital signal, said data values occurring with a fixed sample period, said apparatus comprising:

first reordering means for reordering a sequence of data values within each of successive sets of eight of said data values;

first delay means for delaying each output data value produced from said first reordering means by a fixed time delay;

first selector means for selecting one out of two output data values consisting of an output data value of said first delay means, and an output data value of a multiplier means;

first butterfly operational means for executing butterfly operation consisting of addition and subtraction of output data values produced from said first selector means;

second reordering means for reordering a sequence of output data values from said first butterfly operational means;

second delay means for delaying each output data value produced from said second reordering means by a fixed time delay;

second selector means for selecting one out of three output data values consisting of an output data value of said second delay means, an output data value of said multiplier means, and an output data value of a subtractor;

second butterfly operational means for executing a butterfly operation on output data values produced from said second selector means;

third reordering means for reordering a sequence of output data values from said second butterfly operational means;

third delay means for delaying each output data value from said third reordering means by a fixed time delay;

third selector means for selecting one out of three output data values consisting of an output data value of said third delay means, an output data value of said multiplier means, and an output data value of said subtractor;

third butterfly operational means for executing a butterfly operation on output data values from said third selector means;

fourth reordering means for reordering a sequence of output data values produced from said third butterfly operational means, to obtain orthogonally transformed data values;

fourth selector means for selecting one out of three output data values consisting of an output data value from said first reordering means, an output data value from said second reordering means, and an output data value from said third reordering means;

said multiplier means, for multiplying output data values from said fourth selector means by respective ones of a plurality of predetermined coefficients;

fifth selector means for selecting one of two output data values consisting of an output data value from said second reordering means and an output data value from said third reordering means; and said subtractor means, for executing subtraction of output data values produced from said fifth selector means and output data values produced from said multiplier means;

wherein said apparatus executes a specific orthogonal transform computation on each of said sets of 8 successive data values of said input digital signal, by time division multiplex operation of said multiplier means and said subtractor means.

Such an apparatus can be operated to execute both an 8 points inverse cosine transform and a a 2-dimensional inverse cosine transform consisting of a 2 points inverse cosine transform and a 4 points inverse cosine transform.

According to a third aspect, the invention provides an orthogonal transform apparatus coupled to receive successive data values of an input digital signal, said data values occurring with a fixed sample period, said apparatus comprising:

first reordering means for reordering a sequence of data values within each of successive sets of eight of said data values;

first delay means for delaying each output data value produced from said first reordering means by a fixed time delay;

first selector means for selecting one out of two output data values consisting of an output data value of said first delay means, and an output data value of a multiplier means;

first butterfly operational means for executing a butterfly operation consisting of addition and subtraction of output data values produced from said first selector means;

second reordering means for reordering a sequence of output data values produced from said first butterfly operational means;

second delay means for delaying each output data value produced from said second reordering means by a fixed time delay;

second selector means for selecting one out of three output data values consisting of an output data value of said second delay means output data value of said multiplier means, and an output data value of adder/subtractor means;

second butterfly operational means for executing a butterfly operation on output data values produced from said second selector means;

third reordering means for reordering a sequence of output data values from said second butterfly operational means;

third delay means for delaying each output data value from said third reordering means by a fixed time delay;

third selector means for selecting one out of three output data values consisting of an output data value of said third delay means, an output data value of said multiplier means, and an output data value of said adder/subtractor means;

third butterfly operational means for executing a butterfly operation on output data values from said third selector means;

fourth reordering means for reordering a sequence of output data values produced from said third butterfly operational means, to obtain orthogonally transformed data values;

fourth selector means for selecting one out of three output data values consisting of an output data value from said first reordering means, an output data value from said second reordering means, and an output data value from said third reordering means;

said multiplier means, for multiplying output data values from said fourth selector means by respective ones of a plurality of predetermined coefficients;

fifth selector means for selecting one of two output data values consisting of an output data value from said second reordering means and an output data value from said third reordering means; and said adder/subtractor means, for executing addition and subtraction of output data values produced from said fifth selector means;

wherein said apparatus executes a specific orthogonal transform computation on each of said sets of 8 successive data values of said input digital signal, by time division multiplex operation of said multiplier means and said adder/subtractor means.

Such an apparatus can be selectively operated to execute each of a 1-dimensional 8 points cosine transform, a 2-dimensional cosine transform consisting of a 2 points cosine transform and a 4 points cosine transform, a 1-dimensional 8 points inverse cosine transform, and a 2-dimensional inverse cosine transform consisting of a 2 points inverse cosine transform and a 4 points inverse cosine transform.

DESCRIPTION OF PREFERRED EMBODIMENTS

Figure 1:
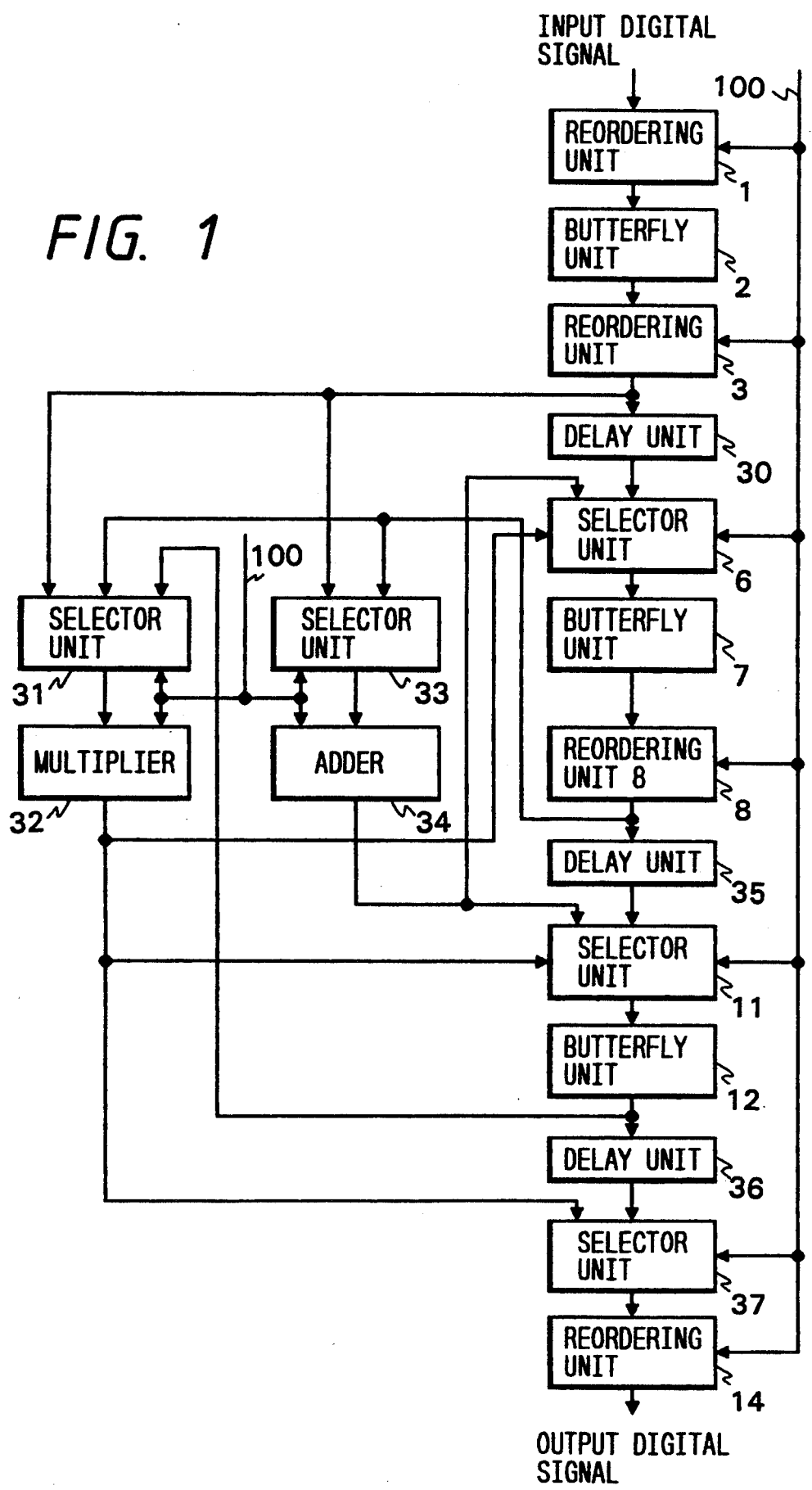
FIG. 1 is a block diagram of a first embodiment of an orthogonal transform apparatus according to the present invention.

FIG. 1 is a block diagram of a first embodiment of an orthogonal transform apparatus according to the present invention. In FIG. 1, numeral 1 denotes a reordering unit for reordering a sequence of data values of an input digital signal, 2 denotes a butterfly unit for executing butterfly operation on the output data values produced from the reordering unit 1, 3 denotes a reordering unit for reordering the output data values produced from the butterfly unit 2, 30 denotes a delay unit for delaying the output data values produced from the reordering unit 3 by a fixed delay time, and 6 denotes a selector unit for selecting an output data value from the delay unit 30, an output data value from a multiplier 32, or an output data value from an adder 34. Numeral 7 denotes a butterfly unit for executing butterfly operation on the output data values produced from the selector unit 6, 8 denotes a reordering unit for reordering the output data values produced from the butterfly unit 7, 35 denotes a delay unit for delaying the output data values produced from the reordering unit 8 by a fixed delay time, and 11 denotes a selector unit for selecting output data values produced from the multiplier 32, outputs produced from the adder 34, or outputs produced from the delay unit 35. Numeral 12 denotes a butterfly unit for executing butterfly operation on the outputs produced from the selector unit 11, 36 denotes a delay unit for delaying the outputs produced from the butterfly unit 12, and 37 denotes a selector unit for selecting output data value data values produced from the delay unit 36 or output data value data values produced from the multiplier 32. Numeral 14 denotes a reordering unit for reordering the output data values produced from the selector unit 37 to obtain an output digital signal consisting of orthogonally transformed data values. Numeral 31 denotes a selector unit for selecting output data values produced from the reordering unit 3, output data values produced from the reordering unit 8, or output data values produced from the butterfly unit 12. Numeral 32 denotes the aforementioned multiplier for multiplication of output data values produced from the selector unit 31, 33 denotes a selector unit for selecting one set of signals from the output data values of the reordering unit 3 or from the output data values of the reordering unit 8. Numeral 34 denotes the aforementioned adder, for executing addition of output data values produced from the selector unit 33.

The block diagram of FIG. 1 is intended as a conceptual diagram, for describing the embodiment, and for that reason various system blocks in that diagram are referred to as "units". However in an actual practical embodiment in accordance with FIG. 1, the respective functions of the various the selector units and the delay units is preferably implemented by a memory and by memory control means for controlling the memory such as to execute write and read operations as required to execute a selection or a delay function. That is to say, a data value is subjected to a specific delay by writing that value into the memory and subsequently reading the value out of memory after a specific integral number of sample periods has elapsed. Similarly, to select one of a plurality of data values produced from respective system blocks, these data values are written beforehand into memory, and selection is executed by reading out the data value that is to be selected. Thus, although the delay and selection functions are shown as being executed separately in FIG. 1, these can of course be implemented in combination, by such use of a memory and memory control circuit.

Figure 7:
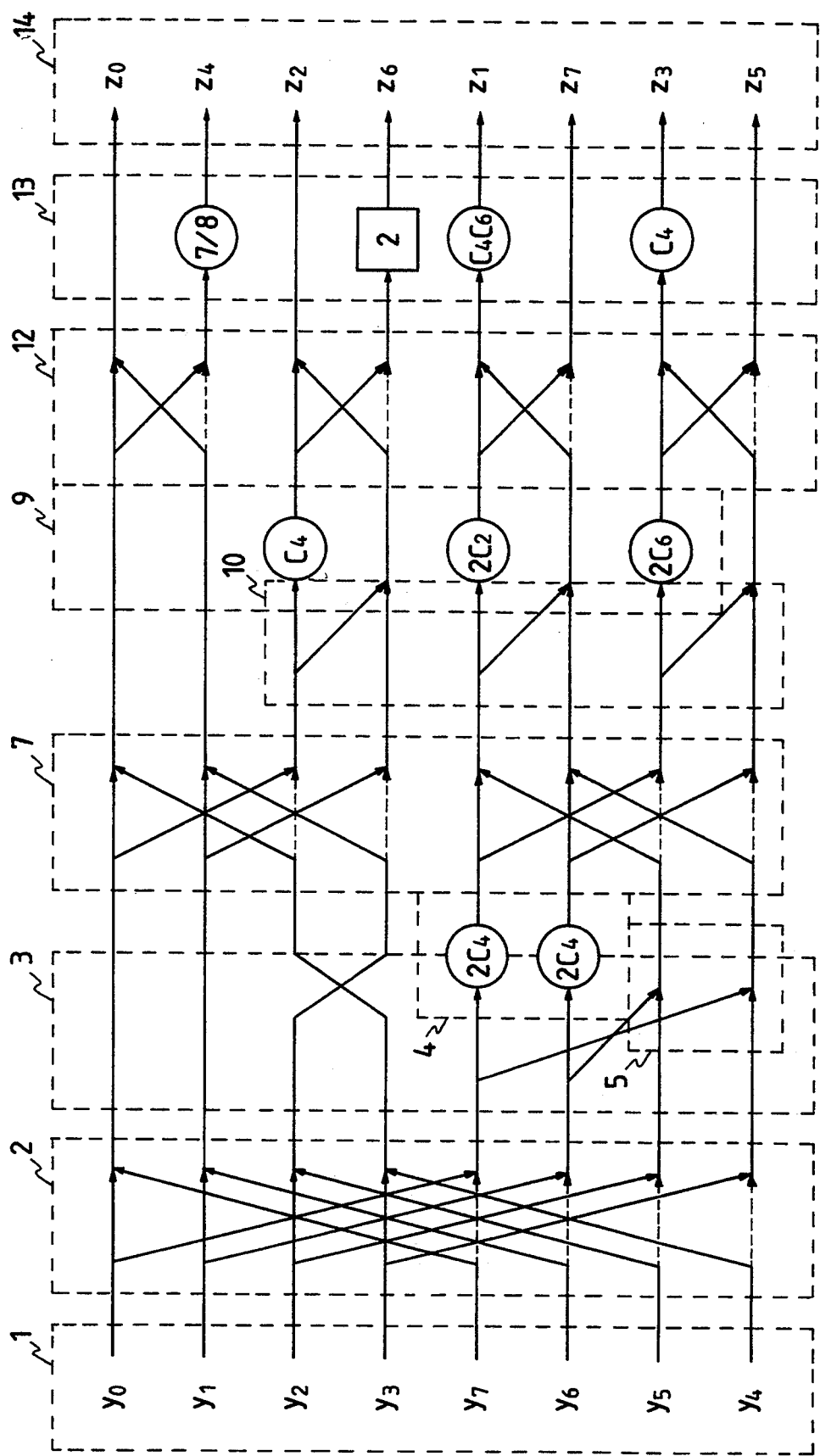
FIG. 7 is a signal flow chart of an algorithm for an 8 points cosine transform.
Figure 8:
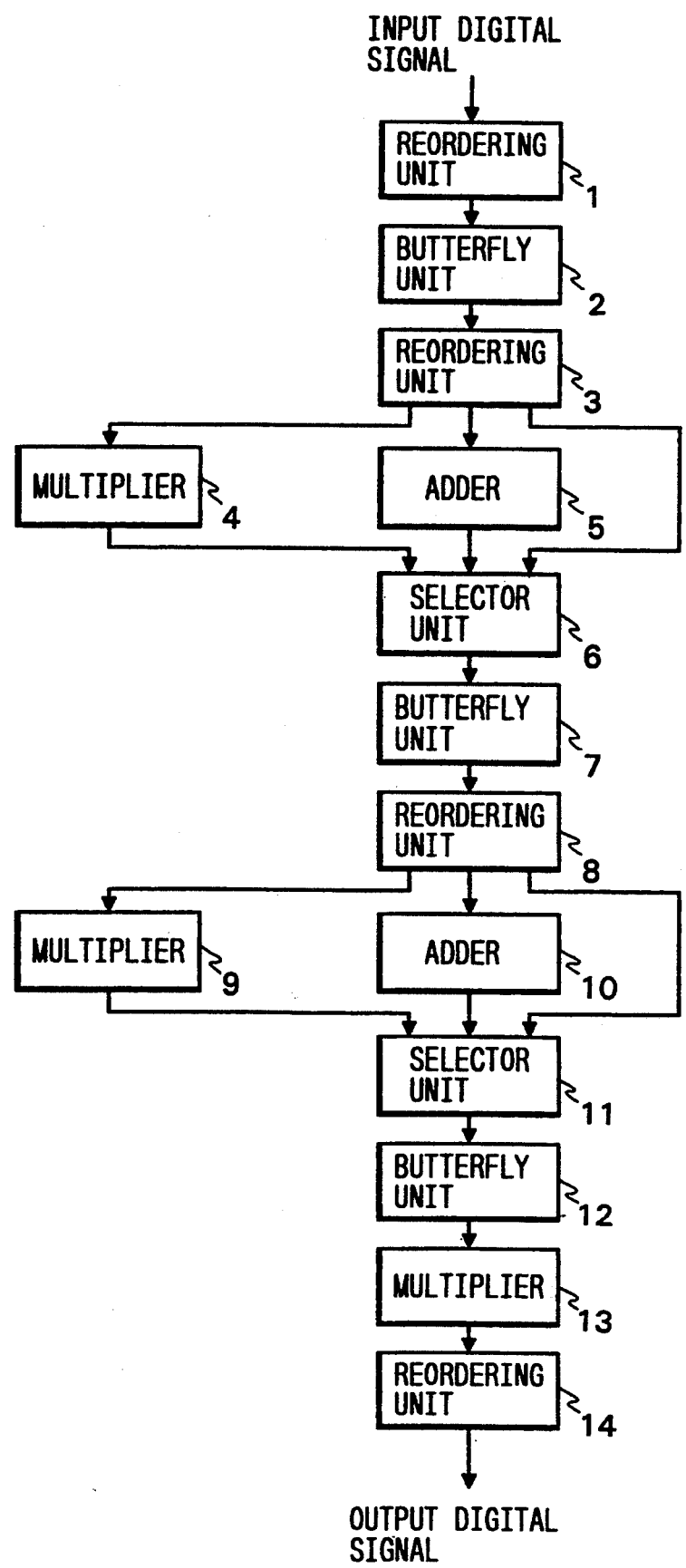
FIG. 8 is a block diagram of an example of a prior art orthogonal transform apparatus for executing the algorithm of FIG. 7.
Figure 12:
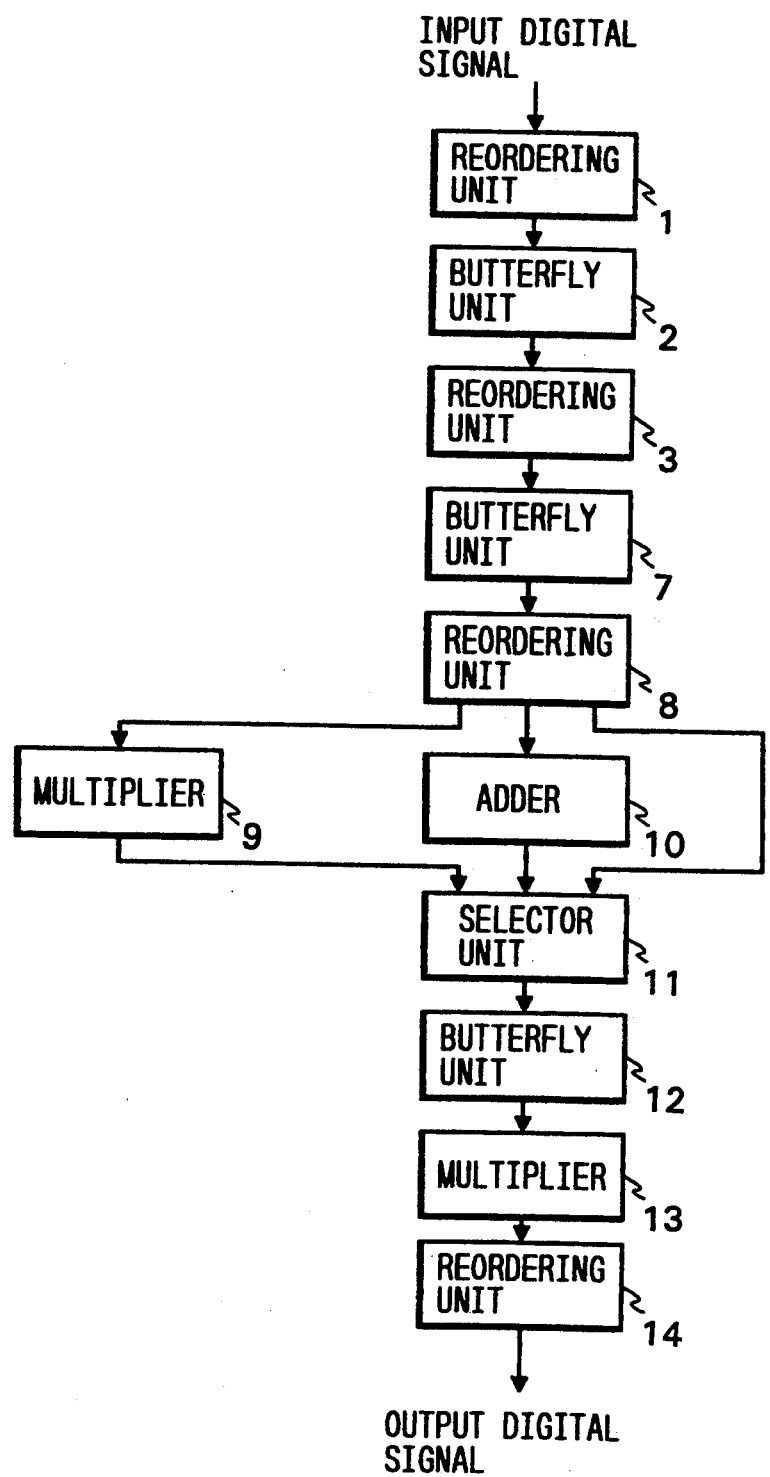
FIG. 12 is a block diagram of an example of a prior art orthogonal transform apparatus for executing the algorithm of FIG. 11.

The operation of the orthogonal transform apparatus according to the present invention having the configuration described above is as follows. In FIG. 1, blocks which have the same operation as blocks in FIG. 8 or FIG. 12 are indicated by corresponding reference numerals. Firstly, the case will be described in which an orthogonal transform is to be executed which is as shown by the signal flow chart of FIG. 7. In FIG. 7, there are 8 actual multiplications to be executed for one orthogonal transform operation. The multiplier 32 of FIG. 1 is capable of executing one multiplication in one sample period, so that all of the multiplication processing can be executed by time division multiplex operation of the multiplier 32, based on control of the aforementioned selector units 6, 31 etc. Also in FIG. 7, addition operations (other than those of the butterfly operation) are executed five times in each orthogonal transform operation, so that since the adder 34 is used to execute one addition in one sample period, all of the addition processing can be executed by time division multiplex operation of the adder 34. In that way, the multiplier 32 executes multiplication processing in place of the multipliers 4, 9 and 13 of FIG. 8, and the adder 34 executes addition processing in place of the adders 5 and 10 of FIG. 8, while the selector unit 31 and selector unit 33 execute data selection as required by the time division multiplex operation of the multiplier 32 and adder 34. The delay units 30, 35 and 36 function to ensure that respective data values that are transferred through each delay unit will be outputted at the appropriate time to be supplied to the corresponding one of the selector units 6, 11 or 37, as required for correctly executing the algorthm shown in FIG. 7.

Figure 15:
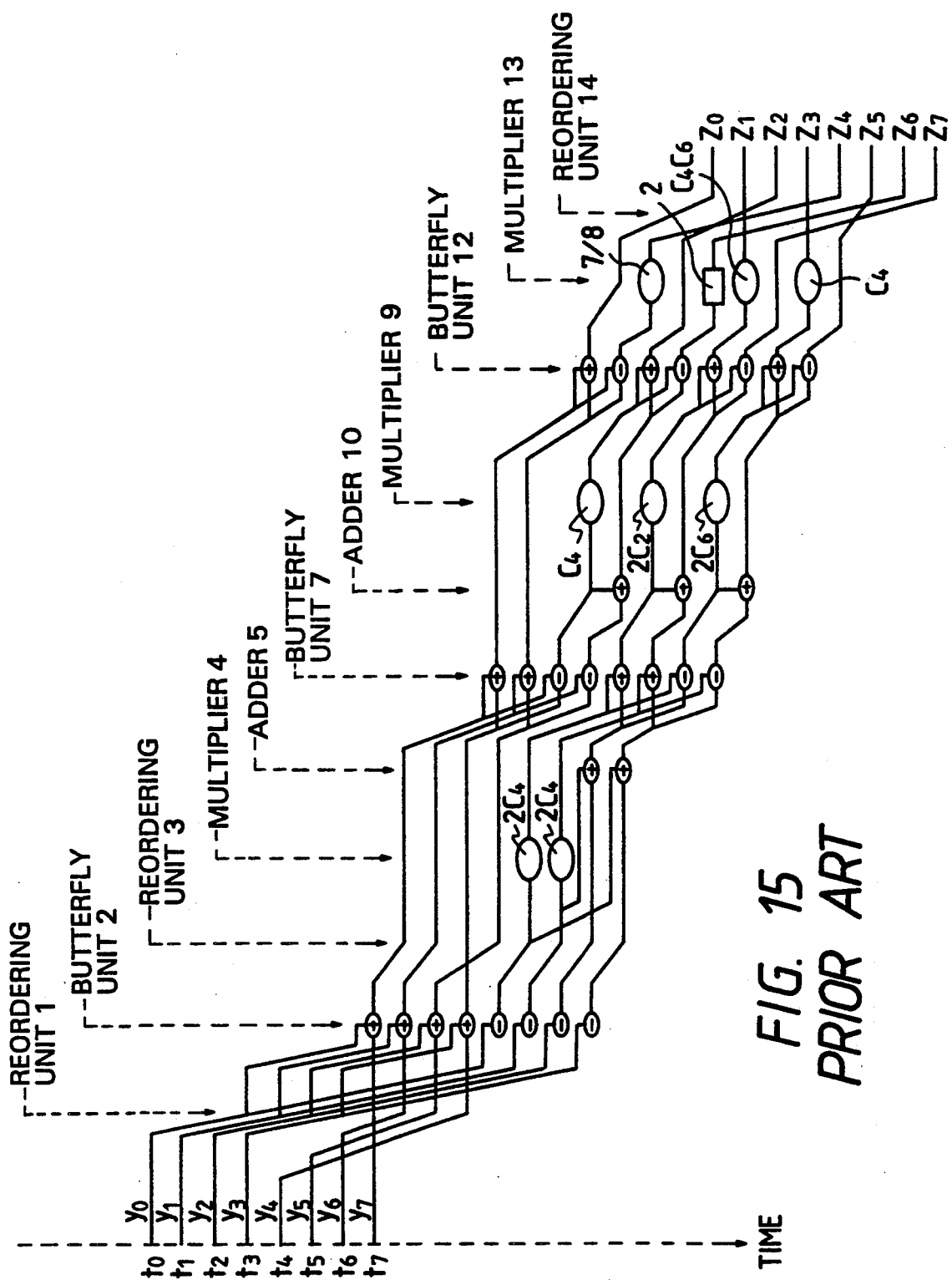
FIG. 15 is an example of a timing chart of the operation of the prior art apparatus of FIG. 8.

The timing of operations for the embodiment of FIG. 1 can be similar to that shown in the timing chart of FIG. 15. However whereas with the prior art orthogonal transform apparatus of FIG. 8 it is possible for two multiplication operations by respective ones of the multipliers to take place within the same sample period, that is of course impossible with the embodiment of FIG. 1, so that for example it would be necessary to modify the timing relationships shown in FIG. 15 so that these multiplications do not occur in parallel. The same is also true for the addition operations executed by the adder 34.

As described hereinabove, in a practical apparatus each of the selector units and each of the delay units can be implemented by the operation of a memory in conjunction with a memory control circuit, so that the incorporation of the selector units 33, 31, delay unit 30, etc. in the apparatus of FIG. 1 do not significantly affect the reduction of scale of hardware that is achieved by eliminating two adders and two multipliers by comparison with the prior art apparatus of FIG. 8.

As a result, the orthogonal transform apparatus of FIG. 1 provides the same operational results as are achieved by the prior art orthogonal transform apparatus of FIG. 8, but with only a single multiplier and a single adder (other than those required to execute the butterfly operations) being required.

Figure 11:
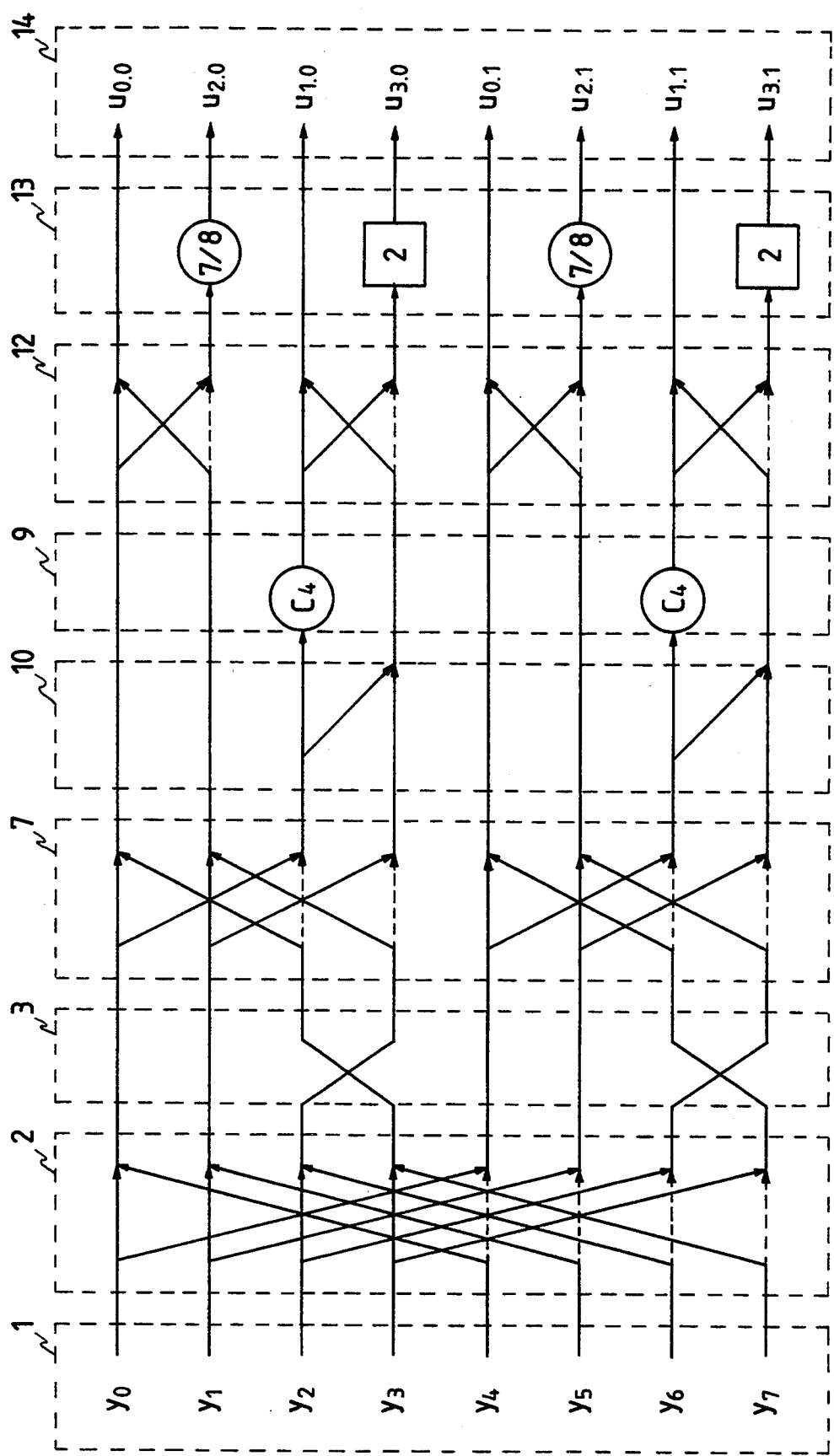
FIG. 11 is a signal flow chart of an algorithm for a 2-dimensional cosine transform which consists of a 2 points cosine transform and a 4 points cosine transform.

Considering now the orthogonal transform algorithm of FIG. 11, in this case there are four actual multiplication operations and two addition operations (other than those of the butterfly operation) in an orthogonal transform. Comparing the orthogonal transform apparatus of FIG. 8 with FIG. 12 (i.e. with the prior art orthogonal transform apparatus described hereinabove for realizing the orthogonal transform of FIG. 11) the multiplier 4, the adder 5 and the selector unit 6 of FIG. 8 are not present in the apparatus of FIG. 12. That is to say, the apparatus of FIG. 12 can be considered as being arrived at by removing these blocks 4, 5 and 6 from the apparatus of FIG. 8, and supplying the output from the reordering unit 3 directly to the butterfly unit 7. Thus it will be clear that, as for the orthogonal transform of the signal flow chart of FIG. 7, the orthogonal transform of FIG. 11 can also be realized by the orthogonal transform apparatus shown in FIG. 1.

Thus with the embodiment of FIG. 1, an orthogonal transform apparatus can be realized for executing a 1-dimensional 8 points cosine transform by using the algorithm shown in FIG. 7, and also for executing a 2-dimensional cosine transform made up of a 2 points cosine transform and a 4 points cosine transform, by using the algorithm shown in FIG. 11. The apparatus of FIG. 1 achieves that by using only 3 butterfly units, a single multiplier, a single adder, and five selector units.

In the orthogonal transforms of FIGS. 7 and 11, respectively different values of operation timings are required for the reordering, addition, multiplication, and selection operations that implement the processing algorithm for each orthogonal transform. In addition, the respective apparatus configurations shown in FIGS. 8 and 12 differ as described hereinabove, so that to convert from the apparatus of FIG. 8 to that of FIG. 12 it is necessary to remove the multiplier 4, the adder 5 and the selector unit 6 of FIG. 8 and supply the output from the reordering unit 3 directly to the butterfly unit 7. In FIG. 1, the various system blocks are respectively designed such as to respond to an changeover control signal 100, which is supplied from an external source (not shown in the drawings), by establishing appropriate operation timings and system configuration for executing the algorithm of FIG. 7 when the signal 100 is in a first condition, and by establishing appropriate operation timings and system configuration for executing the algorithm of FIG. 11 when the signal 100 is in a second condition. The values of the multiplication coefficients are of course also altered in accordance with the algorithm which is to be executed, in response to these two conditions of the changeover control signal 100.

Thus, the embodiment of FIG. 1 can be selectively set to execute either of the two algorithms of FIGS. 7 and 11, by means of the changeover control signal 100.

Figure 2:
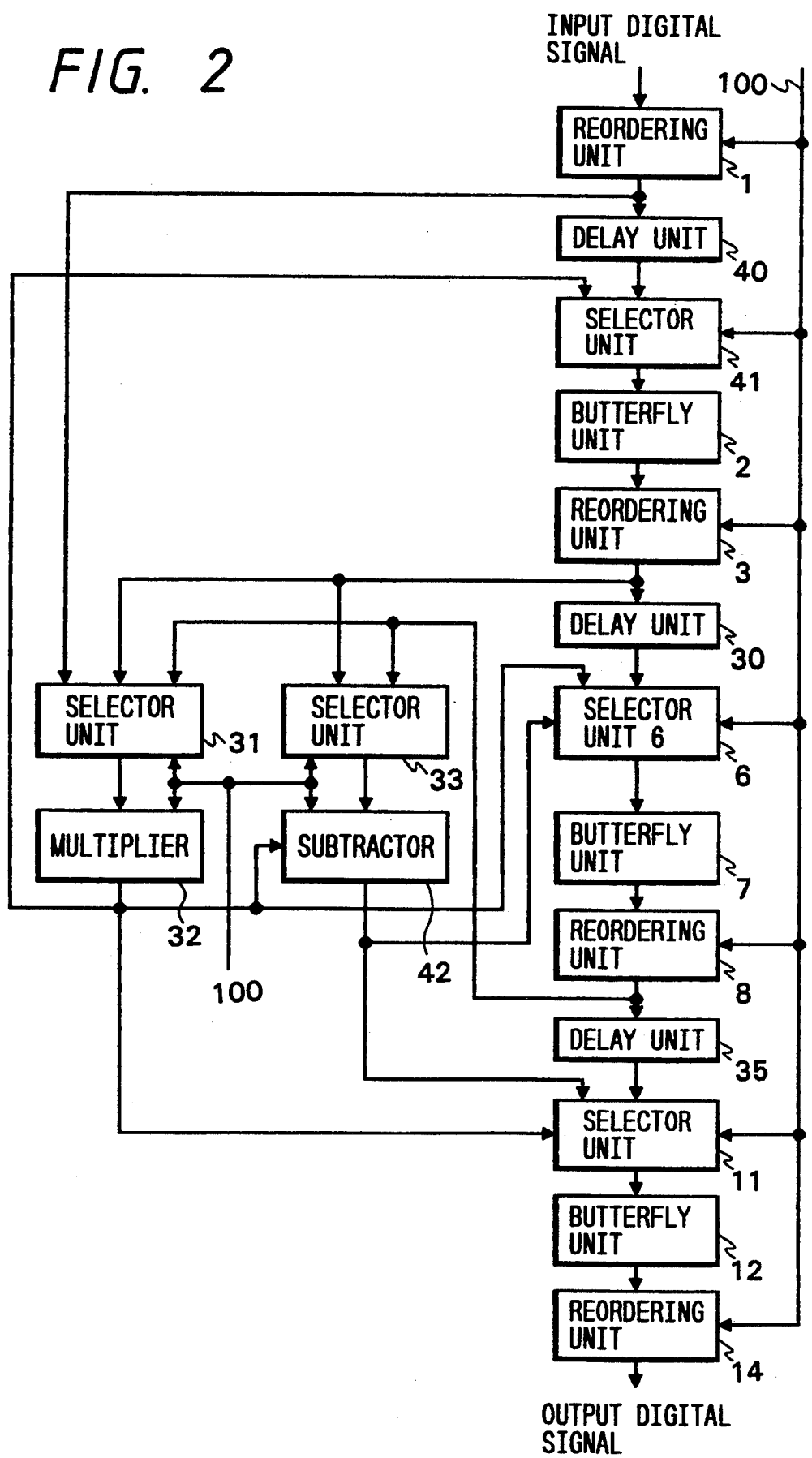
FIG. 2 is a block diagram of a second embodiment of an orthogonal transform apparatus according to the present invention.

FIG. 2 is a block diagram of a second embodiment of an orthogonal transform apparatus according to the present invention. In FIG. 2, numeral 1 denotes a reordering unit for reordering the input signals, 40 denotes a delay unit for delaying the output data values produced from the reordering unit 1, 41 denotes a selector unit for selecting output data values from the delay unit 40 or output data values from a multiplier 32, 2 denotes a butterfly unit for executing butterfly operation on output data values from the selector unit 41, 3 denotes a reordering unit for reordering the output data values produced from the butterfly unit 2, 30 denotes a delay unit for delaying the output data values produced from the reordering unit 3, and 6 denotes a selector unit for selecting the output data values from the delay unit 30 or output data values from the multiplier 32 or output data values from a subtractor 42. Numeral 7 denotes a butterfly unit for executing butterfly operation on output data values produced from the selector unit 6, 8 denotes a reordering unit for reordering the output data values produced from the butterfly unit 7, 35 denotes a delay unit for delaying the output data values produced from the reordering unit 8, 11 denotes a selector unit for selecting output data values from the multiplier 32, output data values from the subtractor 42, or output data values from the delay unit 35. Numeral 12 denotes a butterfly unit for executing butterfly operation on output data values produced from the selector unit 11, and 14 denotes a reordering unit for reordering the output data values produced from the butterfly unit 12 to obtain an output digital signal consisting of orthogonally transformed data values. Numeral 31 denotes a selector unit for selecting output data values from the reordering unit 1, output data values from the reordering unit 3, or output data values from the reordering unit 8. Numeral 32 denotes the aforementioned multiplier for multiplication of output data values produced from the selector unit 31, 33 denotes a selector unit for selecting output data values from the reordering unit 3 or output data values from the reordering unit 8. Numeral 42 denotes the aforementioned subtractor for subtracting output data values produced from the multiplier 32 from output data values produced from the selector unit 33.

Figure 9:
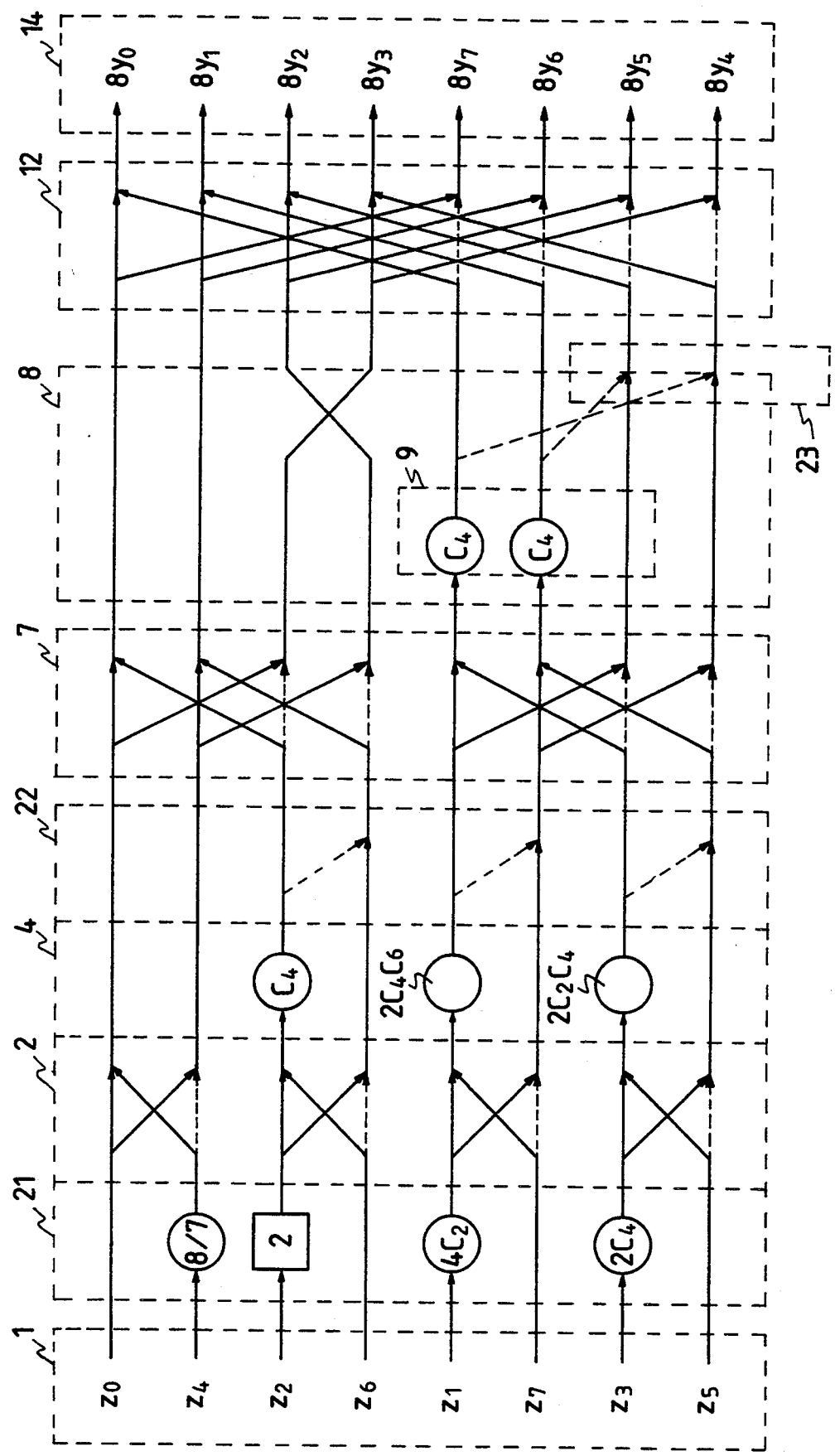
FIG. 9 is a signal flow chart of an algorithm for an 8 points inverse cosine transform.
Figure 10:
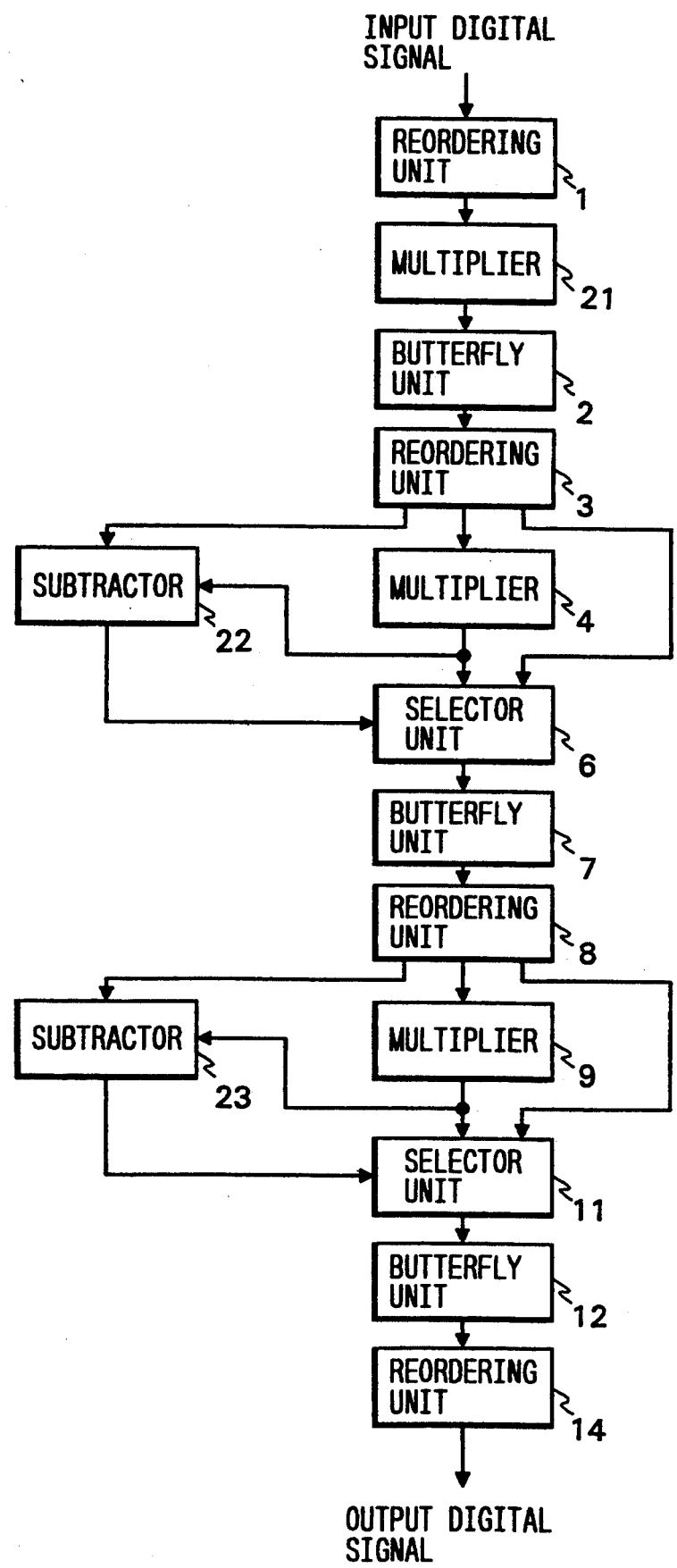
FIG. 10 is a block diagram of an example of a prior art orthogonal transform apparatus for executing the algorithm of FIG. 9.
Figure 14:
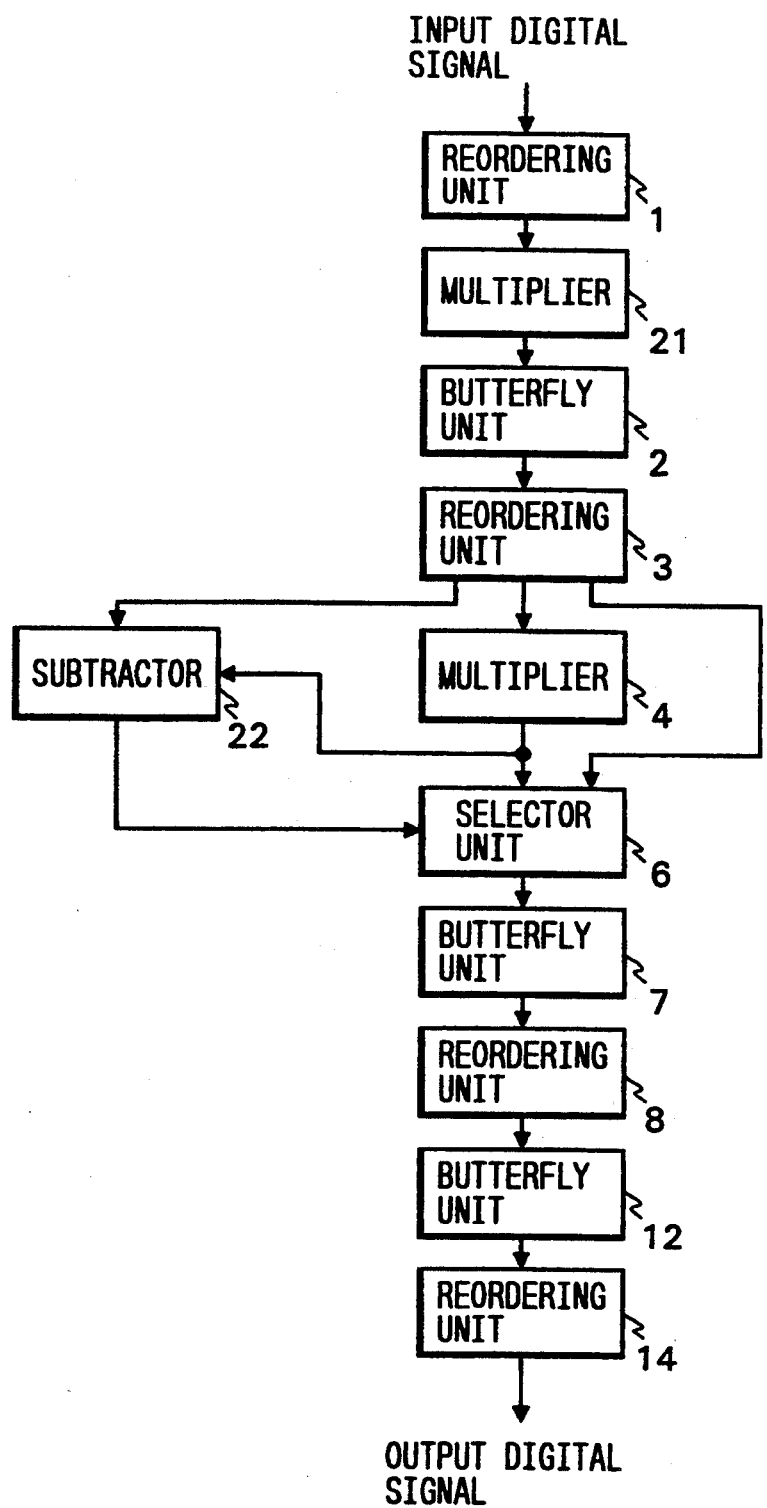
FIG. 14 is a block diagram of an example of a prior art orthogonal transform apparatus for executing the algorithm of FIG. 13.

With an orthogonal transform apparatus according to the present invention having the configuration of FIG. 2, the operation is as follows. Units which have identical operation to units in FIGS. 10 or 14 are designated by corresponding reference numerals. Firstly, the operation will be described for the case of the orthogonal transform that is shown in the signal flow chart of FIG. 9. In FIG. 9, a total of 8 actual multiplication operations are executed for a single orthogonal transform. Thus, by using a multiplier 32 in the embodiment of FIG. 2 which is capable of one multiplication in one sample period, that multiplier can execute all of the multiplication processing by time sharing operation. Furthermore in the case of FIG. 9, the number of subtraction operations (other than those of butterfly operation) is five, so that by using a subtractor which can execute one subtraction within one sample period, all of the subtraction operations can be executed by time sharing operation. In that way, the multiplier 32 of the embodiment of FIG. 2 performs all of the actual multiplications in place of the multipliers 4, 9 and 21 of the orthogonal transform apparatus of FIG. 10, the subtractor 42 executes all of the subtraction operations (other than those of butterfly operations) in place of the subtractors 22 and 23 of FIG. 10, and the selectors 31 and 33 execute data selection in accordance with time division multiplex operation of the multiplier 32 and subtractor 42.

As a result, the same operation as that of the orthogonal transform apparatus of FIG. 10 can be achieved, i.e. the algorithm of FIG. 9 for the 8 points inverse cosine transform can be executed.

Figure 13:
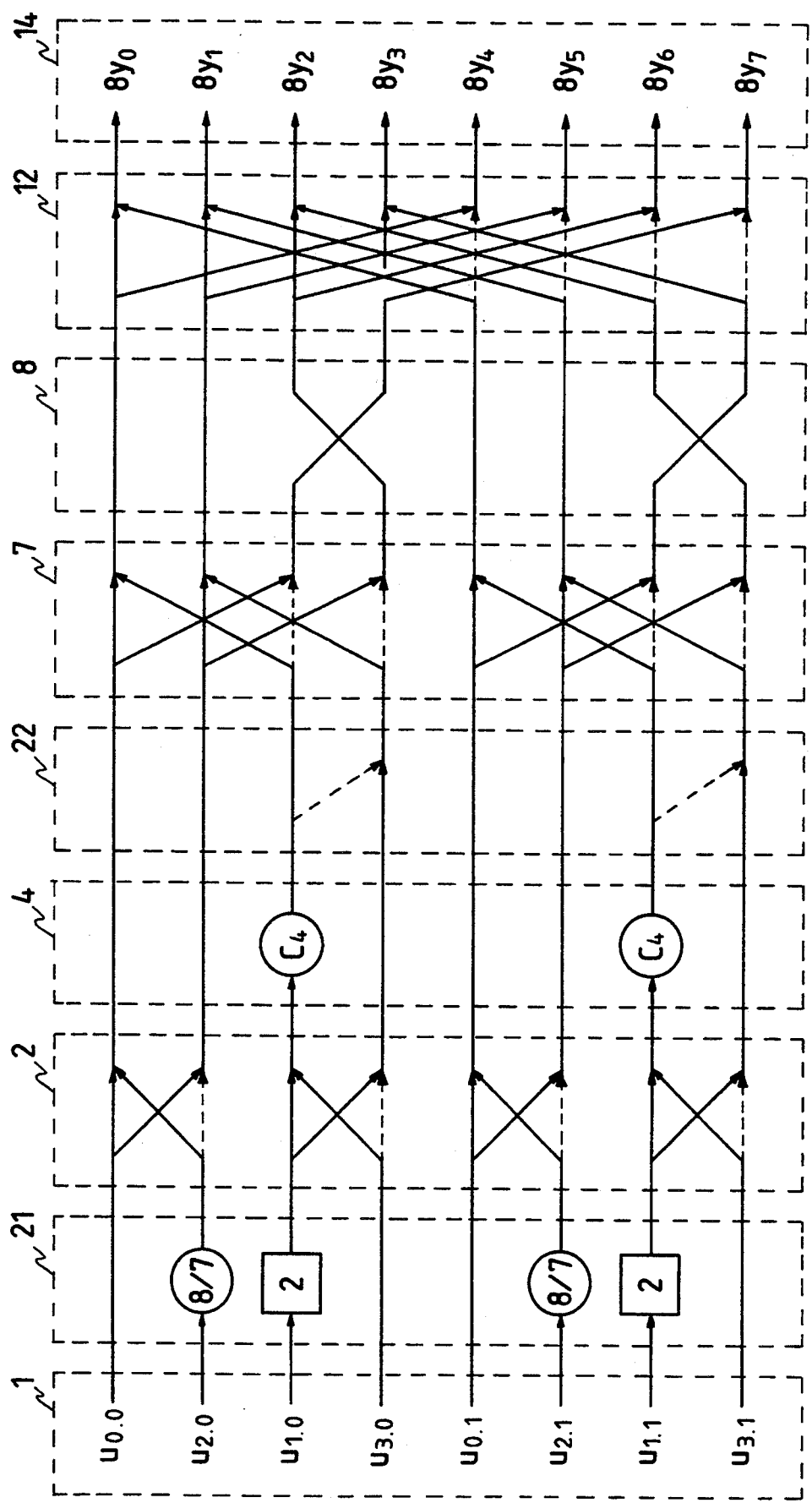
FIG. 13 is a signal flow chart of an algorithm for a 2-dimensional inverse cosine transform which consists of a 2 points inverse cosine transform and a 4 points inverse cosine transform.

Considering the orthogonal transform of FIG. 13, there are four actual multiplication operations and one subtraction operation (other than butterfly operation processing) to be executed for one orthogonal transform. Comparing FIG. 10 with the block diagram of FIG. 14, which is prior art orthogonal transform apparatus described hereinabove for realizing the orthogonal transform of FIG. 13, it can be seen that in FIG. 14 the multiplier 9, the subtractor 23 and the selector unit 11 of FIG. 10 are omitted from the apparatus of FIG. 14. Thus, as for the orthogonal transform of the signal flow chart of FIG. 9, the orthogonal transform apparatus of FIG. 2 can execute the algorithm shown in the signal flow chart of FIG. 13 for the 2-dimensional inverse cosine transform consisting of a 2 points inverse cosine transform and a 4 points inverse cosine transform.

As described in the above, the embodiment of FIG. 2 enables an orthogonal transform apparatus to be realized which is capable of executing either of the two orthogonal transforms that are shown in the signal flow charts of FIGS. 9 and 13 respectively, by using a total of three butterfly units, a single multiplier, a single adder, and five selector units.

In the orthogonal transforms of FIGS. 9 and 13, respectively different values of operation timings are required for the reordering, subtraction, multiplication, and selection operations that implement the processing algorithm for each orthogonal transform. In FIG. 2, as described hereinabove for the embodiment of FIG. 1, the various system blocks are respectively configured to respond to the changeover control signal 100 by establishing appropriate operation timings for the algorithm which is to be executed, and also by altering the values of the multiplication coefficients as required for the algorithm which is to be executed, in accordance with whether the signal 100 is set to a first or a second condition thereof. Thus when the signal 100 is set to its first condition, the apparatus of FIG. 2 is configured to execute the algorithm of FIG. 9, and with signal 100 set to its second condition the apparatus is configured to execute the algorithm of FIG. 13.

Figure 3:
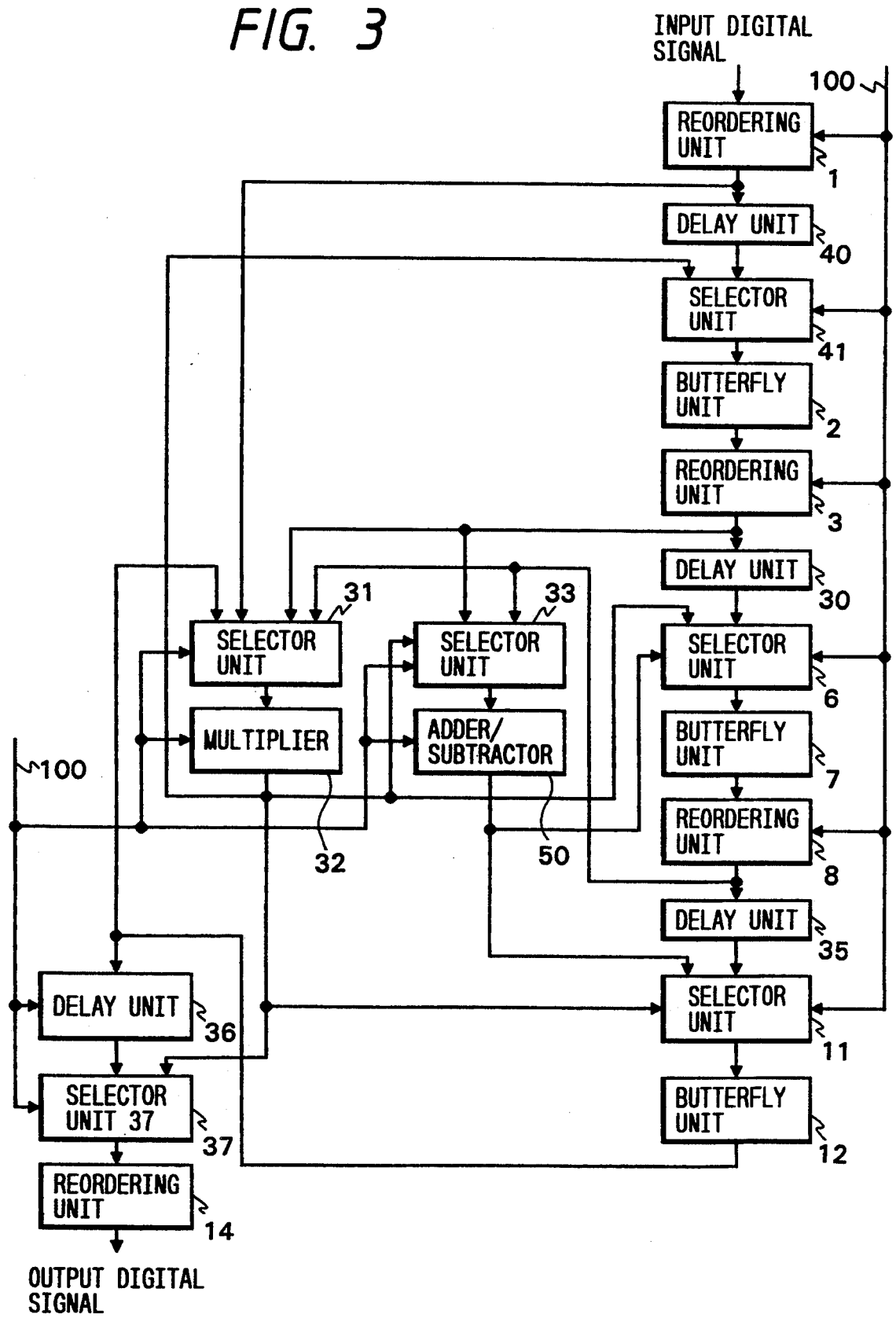
FIG. 3 is a block diagram of a third embodiment of an orthogonal transform apparatus according to the present invention, which can execute two orthogonal transforms that can be executed by the embodiment of FIG. 1 and also two orthogonal transforms that can be executed by the embodiment of FIG. 2.

FIG. 3 is a block diagram of a third embodiment of an orthogonal transform apparatus according to the present invention. In FIG. 3, numeral 1 denotes a reordering unit for reordering the input signals, 40 denotes a delay unit for delaying the output data values produced from the reordering unit 1, 41 denotes a selector unit for selecting output data values from the delay unit 40 or output data values from a multiplier 32, 2 denotes a butterfly unit for executing butterfly operation on output data values from the selector unit 41, 3 denotes a reordering unit for reordering the output data values produced from the butterfly unit 2, 30 denotes a delay unit for delaying the output data values produced from the reordering unit 3, and 6 denotes a selector unit for selecting the output data values from the delay unit 30 or output data values from the multiplier 32 or output data values from an adder/subtractor 50. Numeral 7 denotes a butterfly unit for executing butterfly operation on output data values produced from the selector unit 6, 8 denotes a reordering unit for reordering the output data values produced from the butterfly unit 7, 35 denotes a delay unit for delaying the output data values produced from the reordering unit 8, 11 denotes a selector unit for selecting output data values from the multiplier 32, output data values from the adder/subtractor 50, or output data values from the delay unit 35. Numeral 12 denotes a butterfly unit for executing butterfly operation on output data values produced from the selector unit 11, 36 denotes a delay unit for delaying the output data values produced from the butterfly unit 12, 37 denotes a selector unit for selecting output data values from the delay unit 36 or output data values from the multiplier 32, and 14 denotes a reordering unit for reordering the output data values produced from the selector unit 37 to obtain obtain an output digital signal consisting of orthogonally transformed data values. Numeral 31 denotes a selector unit for selecting output data values from the reordering unit 1, output data values from the reordering unit 3, or output data values from the reordering unit 8. Numeral 32 denotes the aforementioned multiplier for multiplication of output data values produced from the selector unit 31, 33 denotes a selector unit for selecting output data values from the reordering unit 3 or output data values from the reordering unit 8, or output data values from the multiplier 32, and for outputting one set of data from the selected output data values. Numeral 50 denotes the aforementioned adder/subtractor for addition and subtraction of output data values produced from the selector unit 33.

The embodiment of FIG. 3 constitutes an orthogonal transform apparatus which is capable of realizing each of the four different types of orthogonal transform algorithms that are shown in FIGS. 7, 9, 11 and 13 respectively. With this embodiment, by comparison with the embodiment of FIG. 1, the delay unit 40 and the selector unit 41 are added, and the adder/subtractor 50 replaces the adder 34. It will be clear from the description given hereinabove of the embodiments of FIGS. 1 and 2 that this embodiment can execute each of the the orthogonal transform algorithms of FIGS. 7 and 11 by time division multiplex operation of the adder/subtractor 50 as an adder. Furthermore with this embodiment, by comparison with the embodiment of FIG. 2, the delay unit 36 and selector unit 37 are added, and the adder/subtractor 50 replaces the subtractor 42. Thus, it will be apparent that this embodiment can also execute processing for each of the orthogonal transform algorithms of FIGS. 9 and 13 respectively by time division multiplex operation of the adder/subtractor 50 as a subtractor.

In the orthogonal transform algorithms of of FIGS. 7, 9, 11 and 13, respectively different values of operation timings are required for the reordering, addition, subtraction, multiplication, and selection operations that implement the processing algorithm for each orthogonal transform. In FIG. 3, the control signal 100 can take four respectively different conditions, and the various system blocks are respectively configured to respond to the changeover control signal 100 by establishing appropriate operation timings for the algorithm which is to be executed, and also by altering the values of the multiplication coefficients, as required for the algorithm which is to be executed. That is to say, with the changeover control signal 100 set at a first condition, the apparatus of FIG. 3 becomes configured to execute the orthogonal transform algorithm of FIG. 7, with signal 100 set at a second condition the apparatus of FIG. 3 becomes configured to execute the orthogonal transform algorithm of FIG. 9, with signal 100 set at a third condition the apparatus of FIG. 3 becomes configured to execute the orthogonal transform algorithm of FIG. 11, and with signal 100 set at a fourth condition the apparatus of FIG. 3 becomes configured to execute the orthogonal transform algorithm of FIG. 13, As described in the above, the third embodiment of the invention can realize each of the four types of orthogonal transforms of FIGS. 7, 9, 11 and 13 respectively, by using three butterfly units, a single multiplier, a single adder/subtractor, and five selector units.

Figure 4:
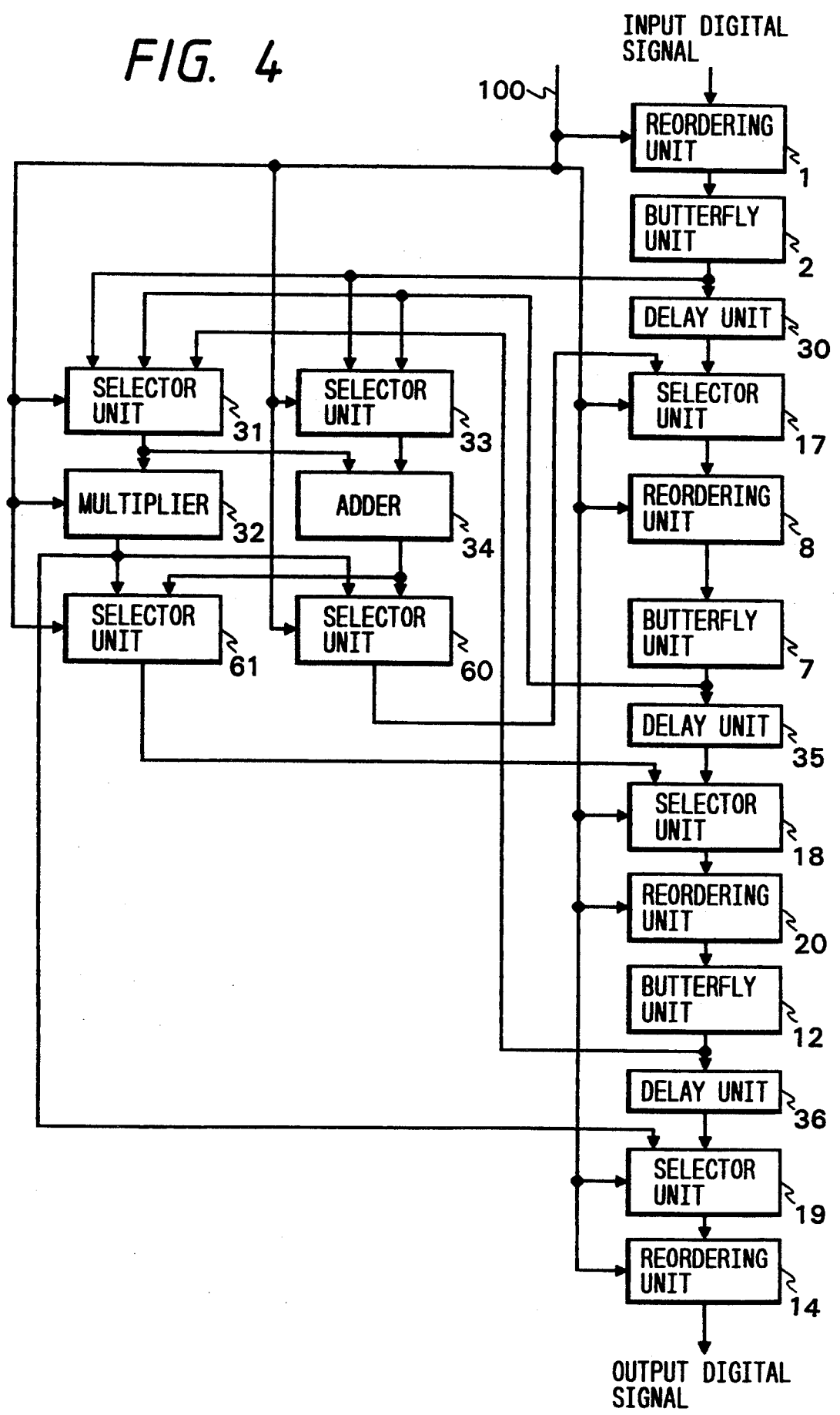
FIG. 4 is a block diagram of a fourth embodiment of an orthogonal transform apparatus according to the present invention.

FIG. 4 is a block diagram of a fourth embodiment of an orthogonal transform apparatus according to the present invention. In FIG. 4, numeral 1 denotes a reordering unit for reordering the input signals, 2 denotes a butterfly unit for executing butterfly operation on output data values from the reordering unit 1, 30 denotes a delay unit for applying a fixed delay to outputs produced from the butterfly unit 2, 17 denotes a selector unit for selecting either an output produced from the delay unit 30 or an output produced from a selector unit 60. Numeral 8 denotes a reordering unit for reordering the outputs produced from the selector unit 17, 7 denotes a butterfly unit for executing butterfly operation on output data values produced from the selector unit reordering unit 8, 35 denotes a delay unit for delaying the output data values produced from the butterfly unit 7 by a fixed amount, 18 denotes a selector unit for selecting either an output produced from a selector unit 61 or an output produced from the delay unit 35, and 20 denotes a reordering unit for reordering the outputs produced from the selector unit 18. Numeral 12 denotes a butterfly unit for executing butterfly operation on output data values produced from the reordering unit 20, 36 denotes a delay unit for delaying the output data values produced from the butterfly unit 12, 19 denotes a selector unit for selecting either an output produced from the delay unit 36 or an outputs produced from multiplier 32, and 14 denotes a reordering unit for reordering the output data values produced from the selector unit 19 to obtain an output digital signal consisting of orthogonally transformed data values. Numeral 31 denotes a selector unit for selecting either the output from the butterfly unit 2, the output from the butterfly unit 7, or the output from the butterfly unit 12. Numeral 32 denotes a multiplier for multiplication of output data values produced from the selector unit 31 by predetermined coefficients, and 33 denotes a selector unit for selecting either the output from the butterfly unit 2, or the output from the butterfly unit 7. 34 denotes an adder for executing addition processing of one set of data that are outputted from the selector unit 33. 60 denotes a selector unit, for selecting either the output of the adder 34 or the output from the multiplier 32, 61 denotes a selector unit for selecting either the output of the adder 34 or the output from the multiplier 32.

In FIG. 4, units having identical operation to units shown in FIG. 8 or FIG. 12 are designated by corresponding reference numerals. The operation for executing the orthogonal transform algorithm of FIG. 7 will first be described. In FIG. 7, there are 8 actual multiplications executed for one orthogonal transform operation. The multiplier 32 is capable of executing one multiplication within one sample period, so that all of the multiplication processing can be executed by time sharing operation. Also in FIG. 7, addition operations (other than those of the butterfly operation) are executed five times for one orthogonal transform operation, so that since the adder 34 can execute one addition within one sample period, all of the addition processing can be executed by time sharing operation of the adder 34. In that way, the multiplier 32 executes multiplication processing in place of the multipliers 4, 9 and 13 of FIG. 8, the adder 34 executes addition processing in place of the adders 5 and 10 of FIG. 8, and the selector unit 31 and selector unit 33 execute data selection by time sharing processing so that the same operation can achieved as that of the system of FIG. 8.

Considering the orthogonal transform that is shown in the signal flow chart of FIG. 11 there are four actual multiplication operations and two addition operations (other than those of the butterfly operation) in one orthogonal transform operation. Comparing FIG. 8 with FIG. 12, i.e. with the prior art orthogonal transform apparatus for realizing the orthogonal transform of FIG. 11, the multiplier 4, the adder 5 and the selector unit 6 of FIG. 12 are eliminated in the apparatus of FIG. 12. Thus, as for the orthogonal transform algorithm of the signal flow chart of FIG. 7, the algorithm of FIG. 11 can also be realized by the orthogonal transform apparatus shown in FIG. 4.

Hence by using the above embodiment, with three butterfly units, a single multiplier, a single adder, and five selector units, each of the orthogonal transform algorithms shown in FIGS. 7 and 11 can be realized.

In the algorithms of FIGS. 7 and 11, respectively different values of operation timings are required for the reordering, subtraction, multiplication, and selection operations that implement the processing algorithm for each orthogonal transform. In FIG. 4, the various system blocks are respectively configured to respond to the changeover control signal 100 by establishing appropriate operation timings for the algorithm which is to be executed, and also by altering the values of the multiplication coefficients as required for that algorithm, in accordance with whether the control signal 100 is set to a first or a second condition thereof. That is to say, when the signal 100 is set to its first condition, the apparatus of FIG. 4 is configured to execute the algorithm of FIG. 7 and with signal 100 set to its second condition the apparatus is configured to execute the algorithm of FIG. 11.

Figure 5:
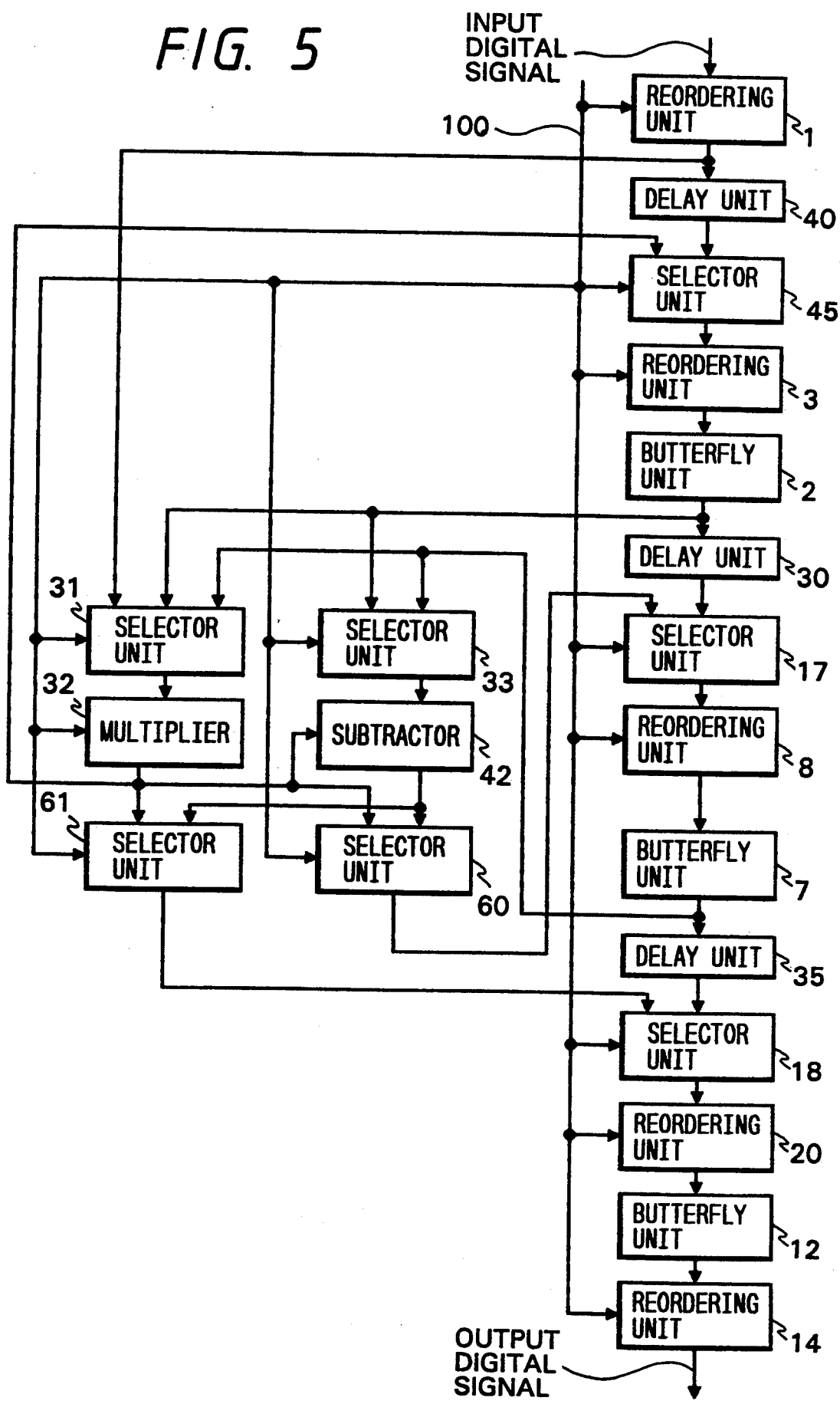
FIG. 5 is a block diagram of a fifth embodiment of an orthogonal transform apparatus according to the present invention.

FIG. 5 is a block diagram of a fifth embodiment of an orthogonal transform apparatus according to the present invention. In FIG. 5, numeral 1 denotes a reordering unit for reordering the input signals, 40 denotes a delay unit for delaying the output from the reordering unit 1 by a fixed time delay, 45 denotes a selector unit for selecting either an output from the delay unit 40 or an output from a multiplier 32, 3 denotes a reordering unit for reordering outputs produced from the selector unit 45, 2 denotes a butterfly unit for executing butterfly operation on output data values from the reordering unit 3, 30 denotes a delay unit for applying a fixed delay to outputs produced from the butterfly unit 2, 17 denotes a selector unit for selecting either an output produced from the delay unit 30 or an output produced from a selector unit 60. Numeral 8 denotes a reordering unit for reordering the outputs produced from the selector unit 17, 7 denotes a butterfly unit for executing butterfly operation on output data values produced from the selector unit reordering unit 8, 35 denotes a delay unit for delaying the output data values produced from the butterfly unit 7 by a fixed amount, 18 denotes a selector unit for selecting either an output produced from a selector unit 61 or an output produced from a delay unit 35, and 20 denotes a reordering unit for reordering the outputs produced from the selector unit 18. Numeral 12 denotes a butterfly unit for executing butterfly operation on output data values produced from the reordering unit 20, and 14 denotes a reordering unit for reordering the output data values produced from the butterfly unit 12 to obtain an output digital signal consisting of orthogonally transformed data values. Numeral 31 denotes a selector unit for selecting either an output produced from the reordering unit 1, and output produced from the butterfly unit 2, an output produced from the butterfly unit 7, or an output Numeral 32 denotes a multiplier for multiplication of output data values produced from the selector unit 31 by predetermined coefficients, and 33 denotes a selector unit for selecting either the output from the butterfly unit 2 or the output from the butterfly unit 7. 42 denotes a subtractor for executing subtraction of an output produced from the multiplier 32 with respect to an output produced from the selector unit 33. 60 denotes a selector unit, for selecting either the output of the subtractor 42 or the output from the multiplier 32, 61 denotes a selector unit for selecting either the output of the subtractor 42 or the output from the multiplier 32

In FIG. 5, units having identical operation to units shown in FIG. 10 or FIG. 14 are designated by corresponding reference numerals. The operation for executing the orthogonal transform of FIG. 9 will first be described. In FIG. 9, there are 8 actual multiplications executed for one orthogonal transform operation. The multiplier 32 is capable of executing one multiplication within one sample period, so that all of the multiplication processing can be executed by time sharing operation. Also in FIG. 9, subtraction operations (other than those of the butterfly operation) are executed five times for one orthogonal transform operation, so that since the subtractor 42 can execute one subtraction within one sample period, all of the subtractor processing can be executed by time sharing operation of the subtractor 42. In that way, the multiplier 32 executes multiplication processing in place of the multipliers 4, 9 and 21 of FIG. 10, the subtractor 42 executes subtraction processing in place of the subtractors 22 and 23 of FIG. 10, and the selector units 31 and 33 execute data selection by time sharing processing so that exactly the same operation can achieved as that of the system of FIG. 10.

Considering the orthogonal transform that is shown in the signal flow chart of FIG. 13 there are four actual multiplication operations and two subtraction operations (other than those of the butterfly operation) in one orthogonal transform operation. Comparing the apparatus of FIG. 14 (for realizing the orthogonal transform of FIG. 13) with FIG. 10, i.e. with the prior art orthogonal transform apparatus for realizing the orthogonal transform of FIG. 9, the multiplier 9, the subtractor 23 and the selector unit 11 of FIG. 10 are eliminated in the apparatus of FIG. 14. Thus, as for the orthogonal transform of the signal flow chart of FIG. 9, the orthogonal transform of FIG. 13 can also be realized by the orthogonal transform apparatus shown in FIG. 5.

Hence by using the above embodiment of FIG. 5, having three butterfly units, a single multiplier, a single subtractor, and seven selector units, an orthogonal transform apparatus which can execute each of the orthogonal transforms shown in FIGS. 9 and 13 can be realized.

In FIG. 5, the various system blocks are respectively configured to respond to the changeover control signal 100 by establishing appropriate operation timings for the algorithm which is to be executed, and also by altering the values of the multiplication coefficients as required for that algorithm, in accordance with whether the changeover control signal 100 is set to a first or a second condition. That is, when the signal 100 is set to its first condition, the apparatus of FIG. 5 is configured to execute the algorithm of FIG. 9 and with signal 100 set to its second condition the apparatus is configured to execute the algorithm of FIG. 13.

Figure 6:
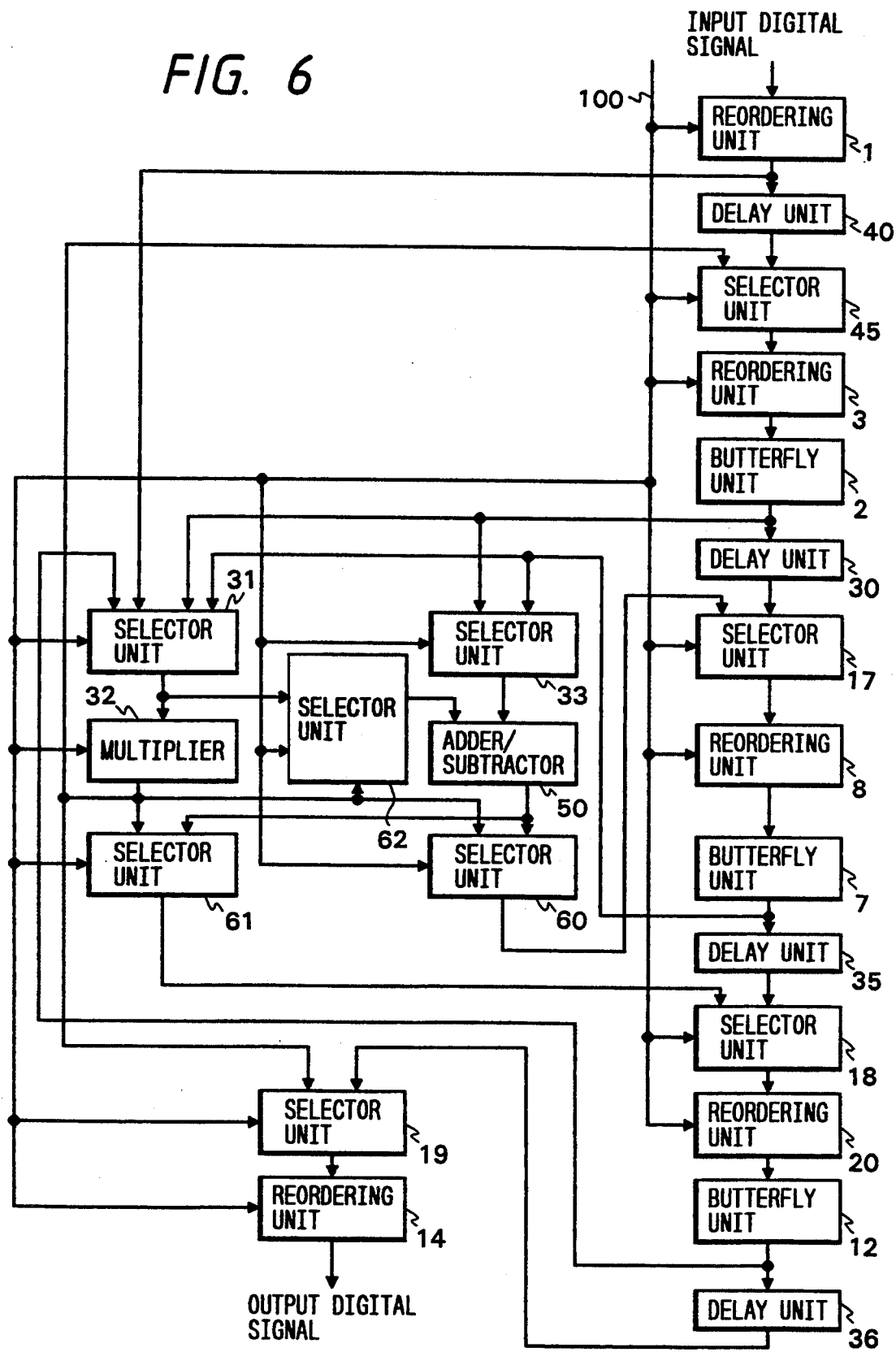
FIG. 6 is a block diagram of a sixth embodiment of an orthogonal transform apparatus according to the present invention, which can execute two orthogonal transforms that can be executed by the embodiment of FIG. 4 and also two orthogonal transforms that can be executed by the embodiment of FIG. 5.

FIG. 6 is a block diagram of a sixth embodiment of an orthogonal transform apparatus according to the present invention. In FIG. 6, numeral 1 denotes a reordering unit for reordering the input signals, 40 denotes a delay unit for delaying the output from the reordering unit 1 by a fixed time delay, 45 denotes a selector unit for selecting either an output from the delay unit 40 or an output from a multiplier 32, 3 denotes a reordering unit for reordering outputs produced from the selector unit 45, 2 denotes a butterfly unit for executing butterfly operation on output data values from the reordering unit 3, 30 denotes a delay unit for applying a fixed delay to outputs produced from the butterfly unit 2, 17 denotes a selector unit for selecting either an output produced from the delay unit 30 or an output produced from a selector unit 60. Numeral 8 denotes a reordering unit for reordering the outputs produced from the selector unit 17, 7 denotes a butterfly unit for executing butterfly operation on output data values produced from the reordering unit 8, 35 denotes a delay unit for delaying the output data values produced from the butterfly unit 7 by a fixed amount, 18 denotes a selector unit for selecting either an output produced from the selector unit 61 or an output produced from a delay unit 35, and 20 denotes a reordering unit for reordering the outputs produced from the selector unit 18. Numeral 12 denotes a butterfly unit for executing butterfly operation on output data values produced from the reordering unit 20. Numeral 31 denotes a selector unit for selecting either an output produced from the reordering unit 1, an output produced from the butterfly unit 2, an output produced from the butterfly unit 7, or an output produced from the butterfly unit 12. Numeral 32 denotes a multiplier for multiplication of output data values produced from the selector unit 31 by predetermined coefficients, and 33 denotes a selector unit for selecting either the output from the butterfly unit 2 or the output from the butterfly unit 7. 50 denotes the adder/subtractor, for executing addition or subtraction of an output produced from a selector unit 62 with respect to an output produced from the selector unit 33. 60 denotes a selector unit, for selecting either the output of the adder/subtractor 50 or the output from the multiplier 32, 61 denotes a selector unit for selecting either the output of the adder/subtractor 50 or the output from the multiplier 32, and selector unit 62 denotes a selector unit for selecting either an outputs produced from selector unit 31 or an outputs produced from multiplier 32. 36 denotes a delay unit for delaying an outputs produced from butterfly unit 12 by a fixed amount, 19 denotes a selector unit for selecting either an outputs produced from delay unit 36 or an outputs produced from multiplier 32, and 14 denotes a reordering unit for reordering the output data values produced from the selector unit 19 to obtain an output digital signal consisting of orthogonally transformed data values.

This embodiment is capable of realizing the four different orthogonal transform algorithms which are shown respectively in the signal flow charts of FIGS. 7, 9, 11 and 13. In the embodiment of FIG. 6, by comparison with the embodiment of FIG. 4, the delay unit 40 and the selector units 45 and 62 are added, and the adder/subtractor 50 is used in place of the adder 34. Thus it will be apparent that this embodiment can execute the orthogonal transforms of FIGS. 7 and 11. Moreover by comparison with the embodiment of FIG. 5, the embodiment of FIG. 6 has the delay unit 36 and selector unit 19 added, and the adder/subtractor 50 replaces the subtractor 42. Thus, from the description given hereinabove of the embodiment of FIG. 5, it will be apparent that the embodiment of FIG. 6 can also execute the orthogonal transforms of FIGS. 9 and 13.

For example, the multiplier 32 executes multiplication processing in place of the multipliers 4, 9 and 21 of FIG. 10, the adder/subtractor 50 executes subtraction processing in place of the subtractors 22 and 23 of FIG. 10, and the selector units 31, 33, 60 and 61 execute data selection as required for time division multiplex operation of the adder/subtractor 50 and the multiplier 32. As a result, the same operation can achieved as that of the system of FIG. 10.

Hence by using the above embodiment of FIG. 6, having three butterfly units, a single multiplier, a single adder/subtractor, and eight selector units, a orthogonal transform apparatus which can execute the respective algorithms for each of the orthogonal transforms shown in FIGS. 7, 9, 11 and 13 can be realized.

In FIG. 6, the control signal 100 (produced from an external source, not shown in the drawing) can be set to four respectively different conditions, and the various system blocks are respectively configured to respond to the changeover control signal 100 by establishing appropriate operation timings for the algorithm which is to be executed, and also by altering the values of the multiplication coefficients as required for the algorithm which is to be executed. Specifically, with the changeover control signal 100 set at a first condition, the apparatus of FIG. 6 becomes configured to execute the orthogonal transform algorithm of FIG. 7, with signal 100 set at a second condition the apparatus of FIG. 6 becomes configured to execute the orthogonal transform algorithm of FIG. 9, with signal 100 set at a third condition the apparatus of FIG. 6 becomes configured to execute the orthogonal transform algorithm of FIG. 11, and with signal 100 set at a fourth condition the apparatus of FIG. 6 becomes configured to execute the orthogonal transform algorithm of FIG. 13.

What is claimed is:

1. An orthogonal transform apparatus coupled to receive successive data values of an input digital signal, said data values occurring with a fixed sample period, the apparatus comprising:

first reordering means (1) for reordering a sequence of data values within each of successive sets of eight of said data values;

first butterfly operational means (2) for executing a butterfly operation consisting of addition and subtraction of output data values produced from said first reordering means;

second reordering means (3) for reordering a sequence of output data values produced from said first butterfly operational means;

first delay means (30) for delaying each output data value produced from said second reordering means by a fixed time delay;

first selector means (6) for selecting one out of three output data values consisting of an output data value of said first delay means (30), an output data value of a multiplier means (32) and an output data value of an adder means (34);

second butterfly operational means (7) for executing a butterfly operation on output data values produced from said first selector means (6);

third reordering means (8) for reordering a sequence of output data values produced from said second butterfly operational means;

second delay means (35) for delaying each output data value produced from said third reordering means by a fixed time delay;

second selector means (11) for selecting one out of three output data values consisting of an output from said second delay means (35), an output from said multiplier means (32), and an output of said adder means (34);

third butterfly operational means (12) for executing a butterfly operation on output data values from said second selector means (11);

third delay means (36) for delaying each output data value produced from said third butterfly operational means by a fixed time delay;

third selector means (37) for selecting one out of two output data values consisting of an output from said third delay means (36) and an output from said multiplier means (32);

fourth reordering means (14) for reordering a sequence of output data values produced from said third selector means to obtain orthogonally transformed data values;

fourth selector means (31) for selecting one out of three output data values consisting of an output data value from said second reordering means (3), an output data value from said third reordering means (8), and an output data value of said third butterfly operational means (12);

said multiplier means (32) multiplying output data values from said fourth selector means (31) by respective ones of a plurality of predetermined coefficients;

fifth selector means (33) for selecting one of two output data values consisting of an output data value from said second reordering means and an output data value from said third reordering means; and said adder means (34) executing addition of output data values produced from said fifth selector means;

wherein said apparatus executes a specific orthogonal transform computation on each of said sets of 8 successive data values of said input digital signal, by time division multiplex operation of said multiplier means and said adder means, wherein said specific orthogonal transform is a 2-dimensional cosine transform consisting of a 2 points cosine transform and a 4 points cosine transform.

2. An orthogonal transform apparatus coupled to receive successive data values of an input digital signal, said data values occurring with a fixed sample period, the apparatus comprising:

first reordering means (1) for reordering a sequence of data values within each of successive sets of eight of said data values;

first butterfly operational means (2) for executing a butterfly operation consisting of addition and subtraction of output data values produced from said first reordering means;

second reordering means (3) for reordering a sequence of output data values produced from said first butterfly operational means;

first delay means (30) for delaying each output data value produced from said second reordering means by a fixed time delay;

first selector means (6) for selecting one out of three output data values consisting of an output data value of said first delay means (30), an output data value of a multiplier means (32) and an output data value of an adder means (34);

second butterfly operational means (7) for executing a butterfly operation on output data values produced from said first selector means (6);

third reordering means (8) for reordering a sequence of output data values produced from said second butterfly operational means;

second delay means (35) for delaying each output data value produced from said third reordering means by a fixed time delay;

second selector means (11) for selecting one out of three output data values consisting of an output from said second delay means (35), an output from said multiplier means (32), and an output of said adder means (34);

third butterfly operational means (12) for executing a butterfly operation on output data values from said second selector means (11);

third delay means (36) for delaying each output data value produced from said third butterfly operational means by a fixed time delay;

third selector means (37) for selecting one out of two output data values consisting of an output from said third delay means (36) and an output from said multiplier means (32);

fourth reordering means (14) for reordering a sequence of output data values produced from said third selector means to obtain orthogonally transformed data values;

fourth selector means (31) for selecting one out of three output data values consisting of an output data value from said second reordering means (3), an output data value from said third reordering means (8), and an output data value of said third butterfly operational means (12);

said multiplier means (32) multiplying output data values from said fourth selector means (31) by respective ones of a plurality of predetermined coefficients;

fifth selector means (33) for selecting one of two output data values consisting of an output data value from said second reordering means and an output data value from said third reordering means; and said adder means (34) executing addition of output data values produced from said fifth selector means;

wherein said apparatus executes a specific orthogonal transform computation on each of said sets of 8 successive data values of said input digital signal, by time division multiplex operation of said multiplier means and said adder means, wherein said apparatus is responsive to respective states of an externally supplied changeover control signal (100) for being selectively set to a first configuration in which said specific orthogonal transform is an 8 points cosine transform and to a second configuration in which said specific orthogonal transform is a 2-dimensional cosine transform consisting of 2 points cosine transform and a 4 points cosine transform.

3. An orthogonal transform apparatus coupled to receive successive data values of an input digital signal, said data values occurring with a fixed sample period, said apparatus comprising:

first reordering means (1) for reordering a sequence of data values within each of successive sets of eight of said data values;

first delay means (40) for delaying each output data value produced from said first reordering means by a fixed time delay;

first selector means (41) for selecting one out of two output data values consisting of an output data value of said first delay means (40), and an output data value of a multiplier means (32);

first butterfly operational means (2) for executing a butterfly operation consisting of addition and subtraction of output data values produced from said first selection means (41);

second reordering means (3) for reordering a sequence of output data values from said first butterfly operational means;

second delay means (30) for delaying each output data value produced from said second reordering means by a fixed time delay;

second selector means (6) for selecting one out of three output data values consisting of an output data value of said second delay means (30), an output data value of said multiplier means (32), and an output data value of a subtractor (42);

second butterfly operational means (7) for executing a butterfly operation on output data values produced from said second selector means (6);

third reordering means (8) for reordering a sequence of output data values from said second butterfly operational means (7);

third delay means (35) for delaying each output data value from said third reordering means (8) by a fixed time delay;

third selector means (11) for selecting one out of three output data values consisting of an output data value of said third delay means (35), an output data value of said multiplier means (32), and an output data value of said subtractor (42);

third butterfly operational means (12) for executing a butterfly operation on output data values from said third selector means (11);

fourth reordering means (14) for reordering a sequence of output data values produced from said third butterfly operational means (12), to obtain orthogonally transformed data values;

fourth selector means (31) for selecting one out of three output data values consisting of an output data value from said first reordering means (1), an output data value from said second reordering means (3), and an output data value from said third reordering means (8);

said multiplier means (32) multiplying output data values from said fourth selector means (31) by respective ones of a plurality of predetermined coefficients;

fifth selector means (33) for selecting one of two output data values consisting of an output data value from said second reordering means (3) and an output data value from said third reordering means (8); and said subtractor means (42) executing subtraction of output data values produced from said fifth selector means and output data values produced from said multiplier means (32);

wherein said apparatus executes a specific orthogonal transform computation on each of said sets of 8 successive data values of said input digital signal, by time division multiplex operation of said multiplier means and said subtractor means, wherein said specific orthogonal transform is a 2-dimensional inverse cosine transform consisting of a 2 points inverse cosine transform and a 4 points inverse cosine transform.

4. An orthogonal transform apparatus coupled to receive successive data values of an input digital signal, said data values occurring with a fixed sample period, said apparatus comprising;

first reordering means (1) for reordering a sequence of data values within each of successive sets of eight of said data values;

first delay means (40) for delaying each output data value produced from said first reordering means by a fixed time delay;

first selector means (41) for selecting one out of two output data values consisting of an output data value of said first delay means (40), and an output data value of a multiplier means (32);

first butterfly operational means (2) for executing butterfly operation consisting of addition and subtraction of output data values produced from said first selection means (41);

second reordering means (3) for reordering a sequence of output data values from said first butterfly operational means;

second delay means (30) for delaying each output data value produced from said second reordering means by a fixed time delay;

second selector means (6) for selecting one out of three output data values consisting of an output data value of said second delay means (30), an output data value of said multiplier means (32), and an output data value of a subtractor (42);

second butterfly operational means (7) for executing a butterfly operation on output data values produced from said second selector means (6);

third reordering means (8) for reordering a sequence of output data values from said second butterfly operational means (7);

third delay means (35) for delaying each output data value from said third reordering means (8) by a fixed time delay;

third selector means (11) for selecting one out of three output data values consisting of an output data value of said third delay means (35), an output data value of said multiplier means (32), and an output data value of said subtractor (42);

third butterfly operational means (12) for executing a butterfly operation on output data values from said third selector means (11);

fourth reordering means (14) for reordering a sequence of output data values produced from said third butterfly operational means (12), to obtain orthogonally transformed data values;

fourth selector means (31) for selecting one out of three output data values consisting of an output data value from said first reordering means (1), an output data value from said second reordering means (3), and an output data value from said third reordering means (8);

said multiplier means (32) multiplying output data values from said fourth selector means (31) by respective ones of a plurality of predetermined coefficients;

fifth selector means (33) for selecting one of two output data values consisting of an output data value from said second reordering means (3) and an output data value from said third reordering means (8); and said subtractor means (42) executing subtraction of output data values produced from said fifth selector means and output data values produced from said multiplier means (32);

wherein said apparatus executes a specific orthogonal transform computation on each of said sets of 8 successive data values of said input digital signal, by time division multiplex operation of said multiplier means and said subtractor means, wherein said apparatus is responsive to respective states of an externally supplied changeover control signal (100) for being selectively set to a first configuration in which said specific orthogonal transform is an 8 points inverse cosine transform and to a second configuration in which said specific orthogonal transform is a 2-dimensional inverse cosine transform consisting of 2 points inverse cosine transform and a 4 points inverse cosine transform.

5. An orthogonal transform apparatus coupled to receive successive data values of an input digital signal, said data values occurring with a fixed sample period, said apparatus comprising:

first reordering means (1) for reordering a sequence of data values within each of successive sets of eight of said data values;

first delay means (40) for delaying each output data value produced from said first reordering means (1) by a fixed time delay;

first selector means (41) for selecting one out of two output data values consisting of an output data value of said first delay means (40) and an output data value of a multiplier means (32);

first butterfly operational means (2) for executing a butterfly operation consisting of addition and subtraction of output data values produced from said first selector means (41);

second reordering means (3) for reordering a sequence of output data values produced from said first butterfly operational means;

second delay means (30) for delaying each output data value produced from said second reordering means by a fixed time delay;

second selector means (6) for selecting one out of three output data values consisting of an output data value of said second delay means (30), an output data value of said multiplier means (32), and an output data value of an adder/subtractor means (50);

second butterfly operational means (7) for executing a butterfly operation on output data values produced form said second selector means (6);

third reordering means (8) for reordering a sequence of output data values from said second butterfly operational means (7);

third delay means (35) for delaying each output data value from said third reordering means (8) by a fixed time delay third selector means (11) for selecting one out of three output data values consisting of an output data value of said third delay means (35), an output data value of said multiplier means (32), and an output data value of said adder/subtractor means (50);

third butterfly operational means (12) for executing a butterfly operation on output data values form said third selector means (11);

fourth delay means (36) for delaying each output data value from said third butterfly means (12) by a fixed time delay;

fourth selector means (37) for selecting one out of two output data values consisting of an output data value from said fourth delay means (36) and an output data value from said multiplier means (32);

fourth reordering means (14) for reordering a sequence of output data values produced from said fourth selector means (37), to obtain orthogonally transformed data values;

fifth selector means (31) for selecting one out of four output data values consisting of an output data value from said first reordering means (1), an output data value from said second reordering means (3), an output data value from said third reordering means (8) and an output data value from said third butterfly means (12);

said multiplier means (32) multiplying output data values from said fifth selector means (31) by respective ones of a plurality of predetermined coefficients;

sixth selector means (33) for selecting one of two output data values consisting of an output data value from said second reordering means (3) and an output data value from said third reordering means (8); and said adder/subtractor means (50) executing addition and subtraction of output data values produced from said sixth selector means;

wherein said apparatus executes a specific orthogonal transform computation on each of said sets of 8 successive data values of said input digital signal, by time division multiplex operation of said multiplier means and said adder/subtractor means, wherein said specific orthogonal transform is one of a set of orthogonal transforms which include an 8 points cosine transform, a 2-dimensional cosine transform consisting of a 2 points cosine transform and a 4 points cosine transform, an 8 points inverse cosine transform, and a 2-dimensional inverse cosine transform consisting of a 2 points inverse cosine transform and a 4 points inverse cosine transform, wherein said apparatus is responsive to respective states of an externally supplied changeover control signal (100) for being selectively set to first, second, third and fourth configuration in which said specific orthogonal transform is said 8 points cosine transform, said 2-dimensional cosine transform, said 8 points inverse cosine transform, and said 2-dimensional inverse cosine transform, respectively.

6. An orthogonal transform apparatus coupled to receive digital data values of an input digital signal, said data values occurring with a fixed sample period, said apparatus comprising:

first reordering means (1) for reordering a sequence of data values within each of successive sets of eight of said data values;

first butterfly operational means (2) for executing a butterfly operation consisting of addition and subtraction of output data values produced from said first reordering means;

first delay means (30) for delaying each output data value produced from said first butterfly operational means (2) by a fixed time delay;

first selector means (17) for selecting one out of two output data values consisting of an output data value of said first delay means (30) and an output data value of a second selector means (60);

said second selector means (6) selecting one out of two output data values consisting of an output data value of a multiplier means (32) and an output data value of an adder means (34);

second reordering means (8) for reordering a sequence of output data values produced from said first selector means (17);

second butterfly operational means (7) for executing a butterfly operation on output data values produced from said second reordering means (8);

second delay means (35) for delaying each output data value produced from said second butterfly operational means (7) by a fixed time delay;

third selector means (18) for selecting one out of two output data values consisting of an output data value of said second delay means (35) and an output data value of a fourth selector means (61);

third reordering means (20) for reordering a sequence of output data values produced from said third selector means (18);

said fourth selector means (61) selecting one out of two output data values consisting of an output data value of said multiplier means (32) and an output data value of said adder means (34);

third butterfly operational means (12) for executing a butterfly operation on output data values produced from said third reordering means (20);

third delay means (36) for delaying each output data value produced from said third butterfly operational means (12) by a fixed time delay;

fifth selector means (19) for selecting one out of two output data values consisting of an output data value of said third delay means (36) and an output data value of said multiplier means (32);

fourth reordering means (14) for reordering a sequence of output data values produced from said fifth selector means (19) to obtain orthogonally transformed data values;

sixth selector means (33) for selecting one out of two output data values consisting of an output data value of said first butterfly operational means (2) and an output data value of said second butterfly operational means (7);

seventh selector means (31) for selecting one out of three output data values consisting of an output data value of said first butterfly operational means (2), an output data value of said second butterfly operational means (7) and an output data value of said third butterfly operational means (12);

said multiplier means (32) multiplying output data values from said seventh selector means (31) by respective ones of a plurality of predetermined coefficients; and said adder means (34) adding an output data value from said sixth selector means (33) and an output data value from said seventh selector means (31);

wherein said apparatus executes a specific orthogonal transform computation on each of said sets of 8 successive data values of said input digital signal, by time division multiplex operation of said multiplier means and said adder means, wherein said specific orthogonal transform is a 2 dimensional cosine transform consisting of a 2 points cosine transform and a 4 points cosine transform.

7. An orthogonal transform apparatus coupled to receive digital data values of an input digital signal, said data values occurring with a fixed sample period, said apparatus comprising:

first reordering means (1) for reordering a sequence of data values within each of successive sets of eight of said data values;

first butterfly operational means (2) for executing a butterfly operation consisting of addition and subtraction of output data values produced from said first reordering means;

first delay means (30) for delaying each output data value produced from said first butterfly operational means (2) by a fixed time delay;

first selector means (17) for selecting one out of two output data values consisting of an output data value of said first delay means (30) and an output data value of a second selector means (60);

said second selector means (60) selecting one out of two output data values consisting of an output data value of a multiplier means (32) and an output data value of an adder means (34);

second reordering means (8) for reordering a sequence of output data values produced from said first selector means (17);

second butterfly operational means (7) for executing a butterfly operation on output data values produced from said second reordering means (8);

second delay means (35) for delaying each output data value produced from said second butterfly operational means (7) by a fixed time delay;

third selector means (18) for selecting one out of two output data values consisting of an output data value of said second delay means (35) and an output data value of a fourth selector means (61);

third reordering means (20) for reordering a sequence of output data values produced from said third selector means (18);

said fourth selector means (61) selecting one out of two output data values consisting of an output data value of said multiplier means (32) and an output data value of said adder means (34);

third butterfly operational means (12) for executing a butterfly operation on output data values produced from said third reordering means (20);

third delay means (36) for delaying each output data value produced from said third butterfly operational means (12) by a fixed time delay;

fifth selector means (19) for selecting one out of two output data values consisting of an output data value of said third delay means (36) and an output data value of said multiplier means (32);

fourth reordering means (14) for reordering a sequence of output data values produced from said fifth selector means (19) to obtain orthogonally transformed data values;

sixth selector means (33) for selecting one out of two output data values consisting of an output data value of said first butterfly operational means (2) and an output data value of said second butterfly operational means (7);

seventh selector means (31) for selecting one out of three output data values consisting of an output data value of said first butterfly operational means (2), an output data value of said second butterfly operational means (7) and an output data value of said third butterfly operational means (12);

said multiplier means (32) multiplying output data values from said seventh selector means (31) by respective ones of a plurality of predetermined coefficients; and said adder means (34) adding an output data value from said sixth selector means (33) and an output data value from said seventh selector means (31);

wherein said apparatus executes a specific orthogonal transform computation on each of said sets of 8 successive data values of said input digital signal, by time division multiplex operation of said multiplier means and said adder means, wherein said apparatus is responsive to respective states of an externally supplied changeover control signal (100) for being selectively set to a first configuration in which said specific orthogonal transform is an 8 points cosine transform and to a second configuration in which said specific orthogonal transform is a 2 dimensional cosine transform consisting of a 2 points cosine transform and a 4 points cosine transform.

8. An orthogonal transform apparatus coupled to receive successive data values of an input digital signal, said data values occurring with a fixed sample period, said apparatus comprising:

first reordering means (1) for reordering a sequence of data values within each of successive sets of eight of said data values;

first delay means (40) for delaying each output data value produced from said first reordering means (1) by a fixed time delay;

first selector means (45) for selecting one out of two output data values consisting of an output data value of said first delay means (40) and an output data value of a multiplier means (32);

second reordering means (3) reordering a sequence of output data values produced from said first selector means (45);

first butterfly operational means (2) for executing a butterfly operation of output data values produced from said second reordering means (3);

second delay means (30) for delaying each output data value produced from said butterfly operational means (2) by a fixed time delay;

second selector means (17) for selecting one out of two output data values consisting of an output data value of said second delay means (30) and an output data value of a third selector means (60);

said third selector means (60) selecting one out of two output data values consisting of an output data value of said multiplier means (32) and an output data value of a subtractor means (42);

third reordering means (8) for reordering a sequence of output data values produced from said second selector means (17);

second butterfly operational means (7) for executing a butterfly operation on output data values produced from said third reordering means (8);

third delay means (35) for delaying each output data value produced from said second butterfly operational means (7) by a fixed time delay;

fourth selector means (18) for selecting one out of two output data values consisting of an output data value of said third delay means (35) and an output data value of a fifth selector means (610;

fifth selector means (61) for selecting one out of two output data values consisting of an output data value of said multiplier means (32) and an output data value of said subtractor means (42);

fourth reordering means (20) for reordering a sequence of output data values produced from said fourth selector means (18);

third butterfly operational means (12) for executing a butterfly operation on output data values produced from said fourth reordering means (20), fifth reordering means (14) for reordering a sequence of output data values produced from said third butterfly operational means (12) to produce orthogonally transformed data values;

sixth selector means (31) for selecting one out of three output data values consisting of an output data value of said second butterfly operational means (2) and an output data value of said first reordering means 91);

said multiplier means (32) multiplying output data values produced from said sixth selector means (31) by respective ones of a plurality of predetermined coefficients;

seventh selector means (33) for selecting one out of two output data values consisting of an output data value of said first butterfly operational means (7);

said subtractor means (42) executing subtraction of output data values produced from said seventh selector means (33) and said multiplier means (32);

wherein said apparatus executes a specific orthogonal transform computation on each of said sets of 8 successive data values of said input digital signal, by time division multiplex operation of said multiplier means and of said subtractor means, wherein said specific orthogonal transform is a 2-dimensional inverse cosine transform consisting of a 2 points inverse cosine transform and a 4 points inverse cosine transform.

9. An orthogonal transform apparatus coupled to receive successive data values of an input digital signal, said data values occurring with a fixed sample period, said apparatus comprising:

first reordering means (1) for reordering a sequence of data values within each of successive sets of eight of said data values;

first delay means (40) for delaying each output data value produced from said first reordering means (1) by a fixed time delay;

first selector means (45) for selecting one out of two output data values consisting of an output data value of said first delay means (40) and an output data value of a multiplier means (32);

second reordering means (3) reordering a sequence of output data values produced from said first selector means (45);

first butterfly operational means (2) for executing a butterfly operation of output data values produced form said second reordering means (3);

second delay means (30) for delaying each output data value produced from said butterfly operational means (2) by a fixed time delay;

second selector means (17) for selecting one out of two output data values consisting of an output data value of said second delay means (30) and an output data value of a third selector means (60);

said third selector means (60) selecting one out of two output data values consisting of an output data value of said multiplier means (32) and an output data value of subtractor means (42);

third reordering means (8) for reordering a sequence of output data values produced from said second selector means (17);

second butterfly operational means (7) for executing a butterfly operation on output data values produced from said third reordering means (8);

third delay means (35) for delaying each output data value produced from said second butterfly operational means (7) by a fixed time delay;

fourth selector means (18) for selecting one out of two output data values consisting of an output data value of said third delay means (35) and an output data value of a fifth selector means (61);

fifth selector means (61) for selecting one out of two output data values consisting of an output data value of said multiplier means (32) and an output data value of said subtractor means (42);

fourth reordering means (20) for reordering a sequence of output data values produced from said fourth selector means (18);

third butterfly operational means (12) for executing a butterfly operation on output data values produced from said fourth reordering means (20);

fifth reordering means (14) for reordering a sequence of output data values produced from said third butterfly operational means (12) to produce orthogonally transformed data values;

sixth selector means (31) for selecting one out of three output data values consisting of an output data value of said second butterfly operational means (7), an output data value of said first butterfly operational means (2) and an output data value of said first reordering means (1);

said multiplier means (32) multiplying output data values produced from said sixth selector means (31) by respective ones of a plurality of predetermined coefficients;

seventh selector means (33) for selecting one out of two output data values consisting of an output data value of said first butterfly operational means (2) and an output data value of said second butterfly operational means (7);

said subtractor means (42) executing subtraction of output data values produced from said seventh selector means (33) and said multiplier means (32);

wherein said apparatus executes a specific orthogonal transform computation on each of said sets of 8 successive data values of said input digital signal, by time division multiplex operation of said multiplier means and of said subtractor means, wherein said apparatus is responsive to respective states of an externally supplied changeover control signal (100) for being selectively set to a first configuration in which said specific orthogonal transform is an 8 points inverse cosine transform and to a second configuration in which said specific orthogonal transform is a 2-dimensional inverse cosine transform consisting of a 2 points inverse cosine transform and a 4 points inverse cosine transform.

10. An orthogonal transform apparatus, coupled to receive successive data values of an input digital signal, said data values occurring with a fixed sample period, said apparatus comprising:

first reordering means (1) for reordering a sequence of data values within each of successive sets of eight of said data values;

first delay means (40) for delaying each output data value produced from said first reordering means (1) by a fixed time delay;

first selector means (45) for selecting one out of two output data values consisting of an output data value of said first delay means (40) and an output data value of a multiplier means (32);

second reordering means (3) reordering a sequence of output data values produced from said first selector means (45);

first butterfly operational means (2) for executing butterfly operation of output data values produced from said second reordering means (3);

second delay means (30) for delaying each output data value produced from said butterfly operational means (2) by a fixed time delay;

second selector means (17) for selecting one out of two output data values consisting of an output data value of said second delay means (30) and an output data value of a third selector means (60);

third reordering means (8) for reordering a sequence of output data values produced from said second selector means (17);

second butterfly operational means (7) for executing a butterfly operation on output data values produced from said third reordering means (8);

third delay means (35) for delaying each output data value produced from said second butterfly operational means (7) by a fixed time delay;

fourth selector means (18) for selecting one out of two output data values consisting of an output data value of said third delay means (35) and an output data value of a fifth selector means (61);

fourth reordering means (20) for reordering a sequence of output data values produced from said fourth selector means (18);

third butterfly operational means (12) for executing a butterfly operation on output data values produced from said fourth reordering means (20);

fourth delay means (36) for delaying each output data value produced from said third butterfly operational means (12) by a fixed time delay;

sixth selector means (19) for selecting one out of two output data values consisting of an output data value of said fourth delay means (36) and an output data value of a multiplier means (32);

fifth reordering means (14) for reordering a sequence of output data values produced from said sixth selector means (19) to produce orthogonally transformed data values;

seventh selector means (31) for selecting one out of four output data values consisting of an output data value of said second butterfly operation means (7), an output data value of said third butterfly operational means (12), an output data value of said first butterfly operational means (2) and an output data value of said first reordering means (1);

said multiplier means (32) multiplying output data values produced from said seventh selector means (31) by respective ones of a plurality of predetermined coefficients;

eights selector means (33) for selecting one out of two output data values consisting of an output data value of said first butterfly operational means (2) and an output data value of said second butterfly operational means (7);

ninth selector means (62) for selecting one out of two data values consisting of an output data value of said multiplier means (32) and an output data value of said seventh selector means (31);

adder/subtractor means (50) for executing subtraction of output data values produced from said ninth selector means (62) and said eighth selector means (33);

said third selector means (60) selecting one out of two output data values consisting of an output data value of said adder/substructure means (50) and an output data value of said multiplier means (32); and said fifth selector means (61) selecting one out of two output data values consisting of an output data value of said adder/subtractor means (50) and an output data value of said multiplier means (32); and wherein said apparatus executes a specific orthogonal transform computation on each of said sets of 8 successive data values of said input digital signal, by time division multiplex operation of said multiplier means and of said subtractor means, wherein said specific orthogonal transform is one of a set of orthogonal transforms which include an 8 points cosine transform, a 2-dimensional cosine transform consisting of a 2 points cosine transform and a 4 points cosine transform, an 8 points inverse cosine transform, and a 2-dimensional inverse cosine transform consisting of a 2 points inverse cosine transform and a 4 points inverse cosine transform, wherein said apparatus is response to respective states of an externally supplied changeover control signal (100 for being selectively set to first, second, third and fourth configuration in which said specific orthogonal transform is said 8 points cosine transform, said 2-dimensional cosine transform, said 8 points inverse cosine transform, and said 2-dimensional inverse cosine transform, respectively.

11. In an orthogonal transform apparatus coupled to receive successive data values of an input digital signal, said apparatus including multiplying means and operating on each of successive first sets of said data values to execute an orthogonal transform operation for producing successive second sets of orthogonally transformed data values respectively corresponding to said first sets by executing a computation including a plurality of multiplications, the improvement wherein said multiplying means comprises a single multiplier, further comprising multiplier control means for controlling said multiplying means and for performing time division multiplexing of operation of said single multiplier to execute said plurality of multiplications, whereby all of said multiplications are executed by time division multiplexing operation of a single multiplier.

* * * * *